United States Patent [19]
Sentilles et al.

[11] Patent Number: 5,820,673
[45] Date of Patent: Oct. 13, 1998

[54] APPARATUS FOR APPLYING COATINGS TO LENSES AND CURING THE COATINGS

[76] Inventors: J. Bruce Sentilles; James T. Sentilles, Sr.; James T. Sentilles, Jr., all of 4800 Silabert Ave., Charlotte, N.C. 28205

[21] Appl. No.: 748,124

[22] Filed: Nov. 12, 1996

[51] Int. Cl.$^6$ .......................... B05B 13/02; B05C 11/02; B05C 5/00; B05C 13/00
[52] U.S. Cl. ............................ 118/319; 118/52; 118/53; 118/58; 118/63; 118/66; 118/320; 118/643
[58] Field of Search ................................ 118/643, 58, 63, 118/66, 52, 319, 320, 53

[56] References Cited

U.S. PATENT DOCUMENTS

| | | |
|---|---|---|
| 3,426,727 | 2/1969 | Balain et al. . |
| 3,538,883 | 11/1970 | Polin . |
| 3,568,632 | 3/1971 | Cawthon . |
| 3,794,314 | 2/1974 | Coburn et al. . |
| 3,971,872 | 7/1976 | LeBoeuf . |
| 3,978,178 | 8/1976 | Oshima et al. . |
| 4,164,099 | 8/1979 | Grant . |
| 4,347,302 | 8/1982 | Gotman . |
| 4,476,162 | 10/1984 | Ireland . |
| 4,544,572 | 10/1985 | Sandvig et al. . |
| 4,728,469 | 3/1988 | Danner et al. . |
| 4,879,318 | 11/1989 | Lipscomb et al. . |
| 4,895,102 | 1/1990 | Kachel et al. . |
| 5,097,136 | 3/1992 | Meyer et al. . |
| 5,164,228 | 11/1992 | Peralta et al. . |
| 5,246,499 | 9/1993 | Peralta et al. . |
| 5,514,214 | 5/1996 | Joel et al. ............................. 118/320 |
| 5,529,728 | 6/1996 | Buazza et al. . |

OTHER PUBLICATIONS

Group of Six AETEK Intenational, Inc., Single Page Flyers, (undated).
The Lens Technology Flyers, Two Pages, (undated).
Frames Product Guide, p. 82 (Coburn/LTI Coating System), p. 83 (Durasystem; UOC Mini–II S/R Coating System) (1995).
Frames Product Guide, p. 80 (Coburn/LTI Coating System), p. 81 (Durasystem; UOC Mini–II S/R Coating System) (1994).
"Coburn Lens Coater Cleans, Coats and Cures in One Unit", Vision Monday, Jan. 8, 1996, one page.
Coburn Lens Coater$^3$ flyer (undated), one page.

*Primary Examiner*—Peter Chin
*Assistant Examiner*—Jacqueline A. Ruller
*Attorney, Agent, or Firm*—Francis M. Pinckney; Dalbert U. Shefte; Karl S. Swayer, Jr.

[57] ABSTRACT

An apparatus for coating a lens and curing the coating on the lens including a lens carrier for griping and holding the lens, a housing having a first set of walls defining a coating chamber with an opening in one of the first walls, the housing also having a second set of walls defining a curing chamber with an opening in one of the second walls. An arrangement for applying a coating to the lens within the coating chamber, an arrangement for projecting ultraviolet radiation within the curing chamber for curing the coating on the lens, and an arrangement for selectively blocking the ultraviolet radiation from passing into the coating chamber are provided. A carriage supports the lens carrier and the lens held thereby and moves the lens carrier and the lens along a predetermined path of motion within the housing, the path of motion moving the lens carrier and the lens through the coating chamber opening into the coating chamber so that the lens is in an inverted disposition during coating of the lens by the arrangement for coating, and moving the lens carrier and the lens through the curing chamber opening into the curing chamber so that the lens is in a vertically oriented disposition during curing of the coating on the lens by the ultraviolet radiation.

26 Claims, 21 Drawing Sheets

APPARATUS FOR APPLYING COATINGS TO LENSES AND CURING THE COATINGS

BACKGROUND OF THE INVENTION

The present invention relates generally to devices for applying coatings to lenses and curing such coatings and, more particularly, to an apparatus and method for coating a lens and curing such coating in which the lens is an inverted disposition during coating of the lens and in a vertically oriented disposition during curing of the coating, and to an apparatus for curing a coating on a lens which employs an arrangement which allows the use of a small, efficient ultraviolet radiation lamp.

The use of plastic ophthalmic lenses has reached a wide level of acceptance in the market for optical elements. Plastic lenses have distinct advantages over lenses made from glass, including substantially lower weight and higher resistance to shattering. However, plastic lenses can easily become scratched in use and, as a practical matter, it is necessary to apply scratch-resistant coatings to the outer surfaces of plastic lenses in order to prevent or reduce such scratching.

Numerous techniques for applying scratch-resistant and other coatings have been developed, including dipping, spraying, and flow coating. Once such coatings have been successfully applied, they must then generally be cured in order to attain the desired degree of hardness, and curing is ordinarily accomplished either by means of heat or exposure to ultraviolet radiation. The use of ultraviolet radiation is ordinarily preferable since it can be accomplished in a much shorter period of time than thermal curing.

Previous devices and processes have been developed for separately coating lenses and curing such coatings, and a limited number of devices for combined coating and curing are known. However, all such known attempts suffer from various drawbacks and disadvantages. For example, U.S. Pat. No. 4,476,162 to Ireland discloses a method for coating a lens which involves holding a lens on its concave side (typically the rear surface as mounted in eyeglasses) by a suction cup on a stem mounted in a handheld motor housing, dipping the convex side of the lens in a vat of coating solution and removing the lens from the solution so that excess coating material is thrown off of the lens by its rotation. This "inverted" disposition of the lens, with the surface to be coated downward, is advantageous for spin coating, since it assists the lens in throwing off excess coating solution. The Ireland device, however, does not provide for efficient, automated operation in that the dipping procedure is accomplished by hand and does not work in coordinated conjunction with a curing device.

An apparatus for curing scratch-resistance coatings is disclosed in U.S. Pat. No. 5,097,136 to Myer et al and includes a lens transport device which holds a lens in an inverted disposition as it is exposed to ultraviolet radiation to cure the coating. The lens is held on the transport system by a suction cup holder and, during exposure to ultraviolet radiation, is positioned directly over an ultraviolet radiation lamp. Thus, should the suction cup have a weak hold on the lens, which may be caused by surface dust, other foreign matter, or raised areas on the lens, the lens may be inadvertently dropped onto or in the vicinity of the ultraviolet radiation lamp, which typically has an operating temperature of over 800° F. Damage to the lens and the relatively expensive ultraviolet lamp may result, and time-consuming cleaning operations may also be required should such an accident occur. The inverted disposition of the lens during curing of the coating is therefore a significant drawback. The Meyer device also does not disclose any specific coating device or method with which it can operate in automated coordination.

U.S. Pat. No. 5,529,728 to Buazza et al discloses a process for lens curing and coating which primarily involves "in-the-mold" coating and curing which occurs before the lens blank is removed from its casting mold. Such "in-the-mold" coating and curing requires a high degree of precision and is subject to the occurrence of coating defects if correct procedures are not followed. Buazza et al also discusses "out-of-the-mold" coating, but does not describe an apparatus or details of a method for accomplishing such coating.

U.S. Pat. No. 4,895,102 to Kachel et al discloses a spin coater apparently primarily intended for spin coating of lens molds. The lens molds are placed on vacuum chucks in a drawer, and coating solution is applied to the lenses from above. The drawer then slides into a chamber where the lenses are exposed to ultraviolet radiation from above to bring about curing of the coating solution. Lenses without molds can be placed on the vacuum chucks for additional exposure to ultraviolet radiation for further curing. During this additional exposure, the lenses themselves are not rotated. The ultraviolet light chamber of Kachel et al requires a relatively large ultraviolet radiation lamp in order to irradiate the full surfaces of one or more lenses from above. The Kachel et al apparatus maintains the lenses in the same disposition as they are first coated and then cured from above, with the lenses sliding in a drawer between the coating and curing areas.

In U.S. Pat. No. 5,246,499 to Peralta et al, an apparatus is provided for coating lenses and then curing the coatings by ultraviolet radiation. As in Kachel et al, the apparatus of Peralta et al applies coating solution onto the lenses from above and also projects radiation onto the lenses from above. Thus, the lenses are maintained in essentially the same disposition as they are moved throughout the Peralta et al apparatus, with the lens surfaces which are to be coated oriented upward. The device of Peralta et al is highly complex and employs industrial robots to move lenses through the various stations of the apparatus. Additionally, the ultraviolet radiation lamp of Peralta et al apparently irradiates the entire surface of at least one lens at the same time.

Accordingly, there is a need for an apparatus and method which can efficiently combine lens coating and curing operations in a compact space and which can orient a lens in a desirable disposition for each operation by inverting the lens during the coating step and orienting the lens vertically during curing of the coating by ultraviolet radiation. Additionally, it is desirable to provide a curing apparatus which does not require an expensive and power-consuming large ultraviolet radiation lamp.

SUMMARY OF THE INVENTION

In accordance with the present invention, an apparatus and method are provided for coating a lens and curing the coating on the lens, such method and apparatus including a lens carrier for gripping and holding the lens and a housing having a first set of walls which define a coating chamber having an opening in one of the first set of walls and a second set of walls which define a curing chamber having an opening in one of the second set of walls. An arrangement is provided for applying a coating to the lens within the coating chamber, and an arrangement is also included for providing ultraviolet radiation within the curing chamber for curing the coating on the lens. The method and apparatus also includes an arrangement for selectively blocking the ultraviolet radiation so as to prevent it from passing into the coating chamber. A carriage is provided for supporting the lens carrier and the lens held thereby along a predetermined path of motion within the housing, the path of motion moving the lens carrier and the lens through the coating chamber opening into the coating chamber so that the lens is in an inverted disposition during coating of the lens by the arrangement for coating, the carriage also moving the lens carrier and the lens through the curing chamber opening into the curing chamber so that the lens is in a vertically oriented disposition during curing of the coating on the lens by the ultraviolet radiation.

In the preferred embodiment of the present invention, the lens carrier includes a hollow spindle having a central longitudinal spindle axis, with a vacuum cup mounted on an end of the spindle for holding the lens. The vacuum cup has a central opening communicating with the hollow interior of the spindle and an arrangement is provided for applying negative pressure through the hollow spindle and the cup opening for gripping and holding the lens.

Preferably, the present invention includes an arrangement for spinning the spindle about the spindle axis. The lens carrier may advantageously include two spindles, each spindle having an end and a cup mounted thereon for holding a lens.

The preferred embodiment also includes a tray opening in the housing and a tray slidably mounted for movement between a receiving position for receiving a lens outside the housing and a lens gripping position inside the housing for gripping of the lens on the tray by the lens carrier. The tray may advantageously include a lens positioning guide for positioning the lens for gripping by the lens carrier, and the lens positioning guide may be resiliently mounted on the tray.

Preferably, the coating chamber opening and the curing chamber opening are disposed in angular relation to each other and the lens carriage includes a pivotal mounting bar pivotally mounted within the housing for pivotal movement between a coating position in which the lens carrier is aligned with the coating chamber opening and a curing position in which the lens carrier is aligned with the curing chamber opening, and a pivot drive to pivot the mounting bar. The present invention may also include a reciprocating air drive cylinder for moving the lens carrier between a retracted position and an extended position for extending the lens carrier and the lens into the coating chamber and the curing chamber.

The arrangement for applying a coating preferably includes a nozzle bar on which are mounted an air nozzle for air cleaning of the lens before applying the coating, and first and second coating nozzles for applying separate coating solutions. The nozzle bar may be slidably mounted for movement between a first coated position and a second coating position.

The second set of walls defining the curing chamber preferably define an ultraviolet radiation aperture, and the arrangement for projecting ultraviolet radiation is preferably positioned to project ultraviolet radiation through the radiation aperture and into the curing chamber. The arrangement for selectively blocking ultraviolet radiation may include a shutter mounted for movement between an aperture closing position and an aperture opening position.

In the preferred embodiment, the arrangement for projecting ultraviolet radiation includes a reflector for reflecting ultraviolet radiation along an axis of reflection and the lens carrier includes a holder for supporting the lens, with the holder having a center. The set of second walls defining the curing chamber include a focusing wall intermediate the reflector and the lens carrier during curing of the coating, and the focusing wall defines an aperture positioned along the axis of reflection of the reflector. The lens carrier is, during curing of the coating, positioned coincident with the axis and in the curing chamber. An arrangement for spinning the lens holder and the lens about the holder center is, in the preferred embodiment, also provided. The aperture permits projection of ultraviolet radiation therethrough into the curing chamber and defines a zone of maximum ultraviolet radiation intensity which extends from the reflector and the aperture along the axis of reflection, with the holder being positioned so that a predetermined portion of the lens supported thereby is within the zone of maximum intensity and the center of the holder is offset from and outside the zone of maximum intensity.

Accordingly, the present invention provides an apparatus and method which efficiently combines lens coating and curing operations and which orients the lens being coated in an inverted disposition during coating operations and a vertically oriented disposition during curing of the coating, thereby providing an advantageous orientation during both operations. Additionally, the present invention allows use of a less expensive and more efficient ultraviolet radiation lamp which need not irradiate the entire lens at once during the curing operation.

BRIEF DESCRIPTION OF THE DRAWINGS

FIG. 8 shows the lens tray and lens having moved inside the apparatus and the reciprocating drive cylinder initiating downward movement to cause the vacuum cup to grip the lens;

FIG. 9 shows the vacuum cup having gripped the lens and the reciprocating drive cylinder initiating its upward stroke;

FIG. 10 shows the lens tray returning to its position partially outside the apparatus and the reciprocating drive beginning its downward stroke to move the lens into the coating chamber;

FIG. 11 shows the nozzle bar beginning its back and forth movement to spray cleaning air over the exposed face of the lens, followed by application of a coating to the lens;

FIG. 12 shows the reciprocating drive cylinder having completed its upward stroke to withdraw the lens from the coating chamber;

FIG. 13 shows the pivot drive having pivoted the pivot bar so as to align the vacuum cup and lens with the curing chamber opening;

FIG. 14 shows the shutter open and the ultraviolet lamp projecting ultraviolet radiation onto the exposed face of the lens to cure the coating;

FIG. 15 shows the reciprocating drive having retracted the lens;

FIG. 16 shows the lens tray beginning its movement into the interior of the apparatus;

FIG. 17 shows the reciprocating drive having returned the lens to the lens tray with the vacuum cup preparing to release the lens;

FIG. 18 shows the reciprocating drive having completed its upward stroke and the lens tray having returned to the exterior of the apparatus with the coated and cured lens ready for retrieval;

DESCRIPTION OF THE PREFERRED EMBODIMENT

Figure 1:
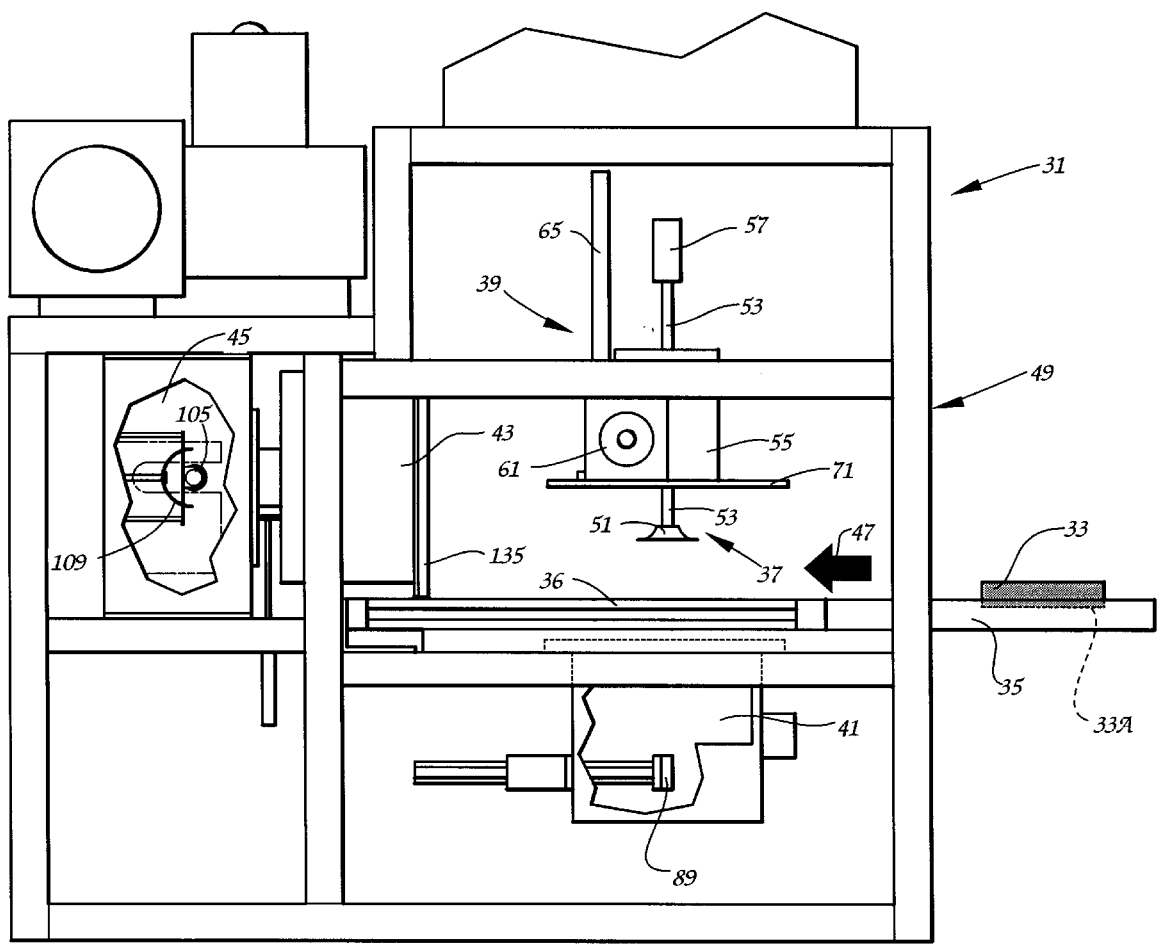
FIG. 1 is a diagrammatic view of the coating and curing apparatus of the present invention.

Looking now in greater detail at the accompanying drawings, FIG. 1 is a diagrammatic view illustrating the preferred embodiment of the apparatus for applying coatings to lenses and curing the coatings in accordance with the present invention, some details of the various components of the apparatus having been omitted for clarity of overall illustration. The coating and curing apparatus 31 is shown with a lens 33 positioned on lens tray 35 in preparation for operation of the apparatus, which generally includes lens carrier 37, carriage 39, coating chamber 41, curing chamber 43, and lamp chamber 45. Upon initiation of a production cycle for coating and curing apparatus 31, lens tray 35 will be moved by track drive 36 in the direction of arrow 47 from its receiving position partially outside the housing 49, as shown in FIG. 1, into the interior of the apparatus.

The apparatus 31 of the present invention is intended to be used for coating and curing operations on lenses which have already been cast and removed from their molds. Typically, such lenses will have had an "in-the-mold" coating applied to at least one surface of the lens, ordinarily the front convex side of the lens as mounted in eyeglasses. The back concave side of such lenses, however, may require grinding to the final contour or prescription, and application of a scratch-resistant coating is highly desirable after such grinding. Apparatus 31 is well-suited for coating the back sides of such lenses, although it can also be used for coating the front side or other lens surfaces. At the beginning of the production cycle for the apparatus 31, the lens surface 33A to be coated is positioned facing downward on lens tray 35.

Lens carrier 37 includes vacuum cup 51 mounted on the end of hollow spindle 53, which is received in spin motor 55 so that spindle 53 and vacuum cup 51 can be driven in spinning rotation. Vacuum fixture 57 is mounted on an end of spindle 53 to provide negative pressure in hollow spindle 53 and vacuum cup 51 for gripping and holding of lens 33 and is connected to a conventional vacuum motor through appropriate conventional vacuum lines (not shown).

Figure 2:
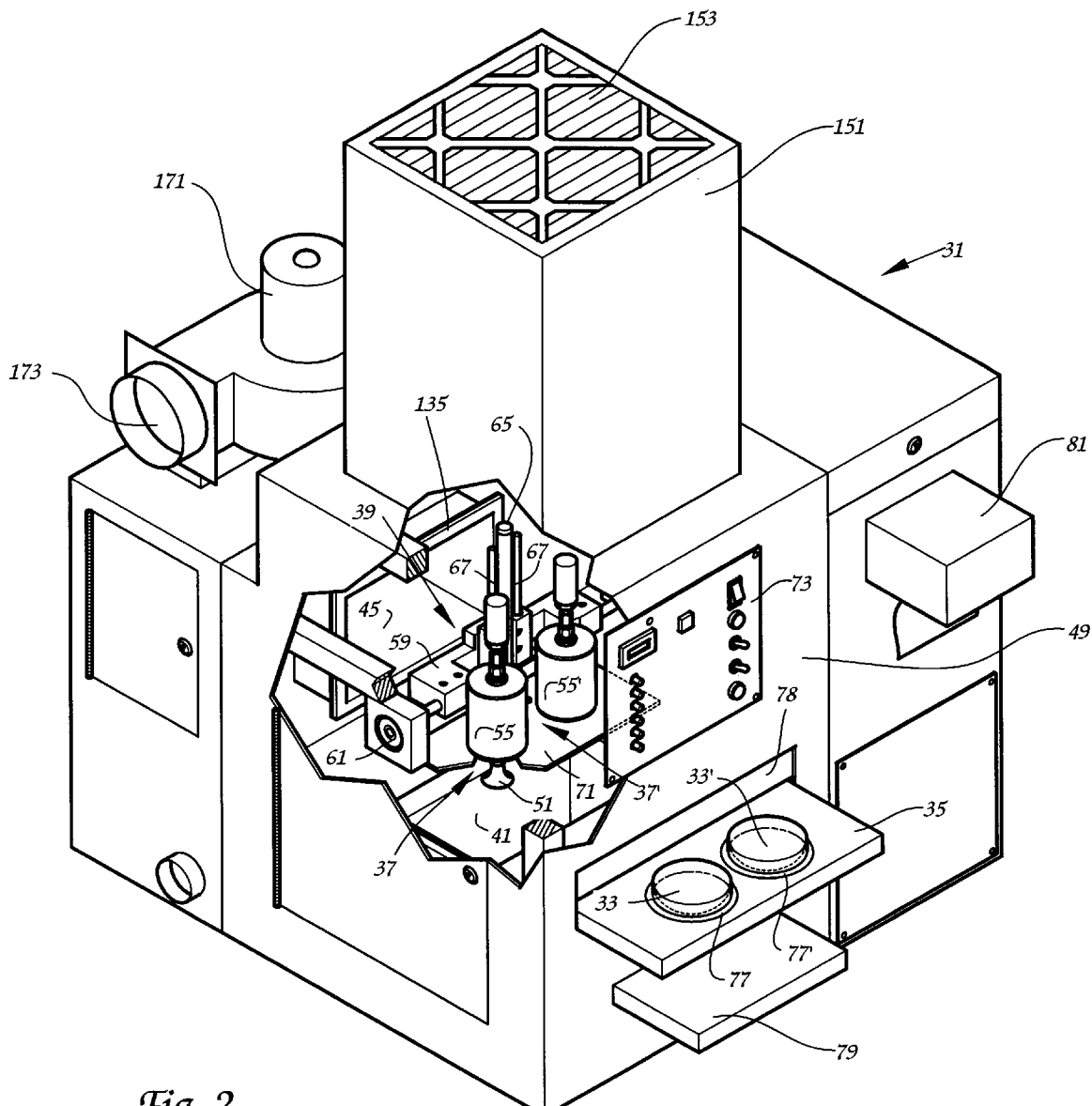
FIG. 2 is an isometric view of the coating and curing apparatus of FIG. 1, partially cut away to show the carriage and lens carriers of the present invention.

FIG. 2 shows the preferred embodiment of the coating and curing apparatus 31 in an isometric view, with housing 49 partially broken away to show details of lens carriers 37,37' and carriage 39. Lens carrier 37' is provided for gripping and holding of a second lens 33'; and includes vacuum cup 51' and spindle 53' (not shown) received in spin motor 55'. Carriage 39 includes pivot bar 59 mounted in pivot bearing 61 and pivot drive 63 (see FIG. 3). Pivot drive 63 is conventional and in the preferred embodiment is a compressed air pivot drive such as the Bimba Pneu-Turn rotary actuator.

Figure 3:
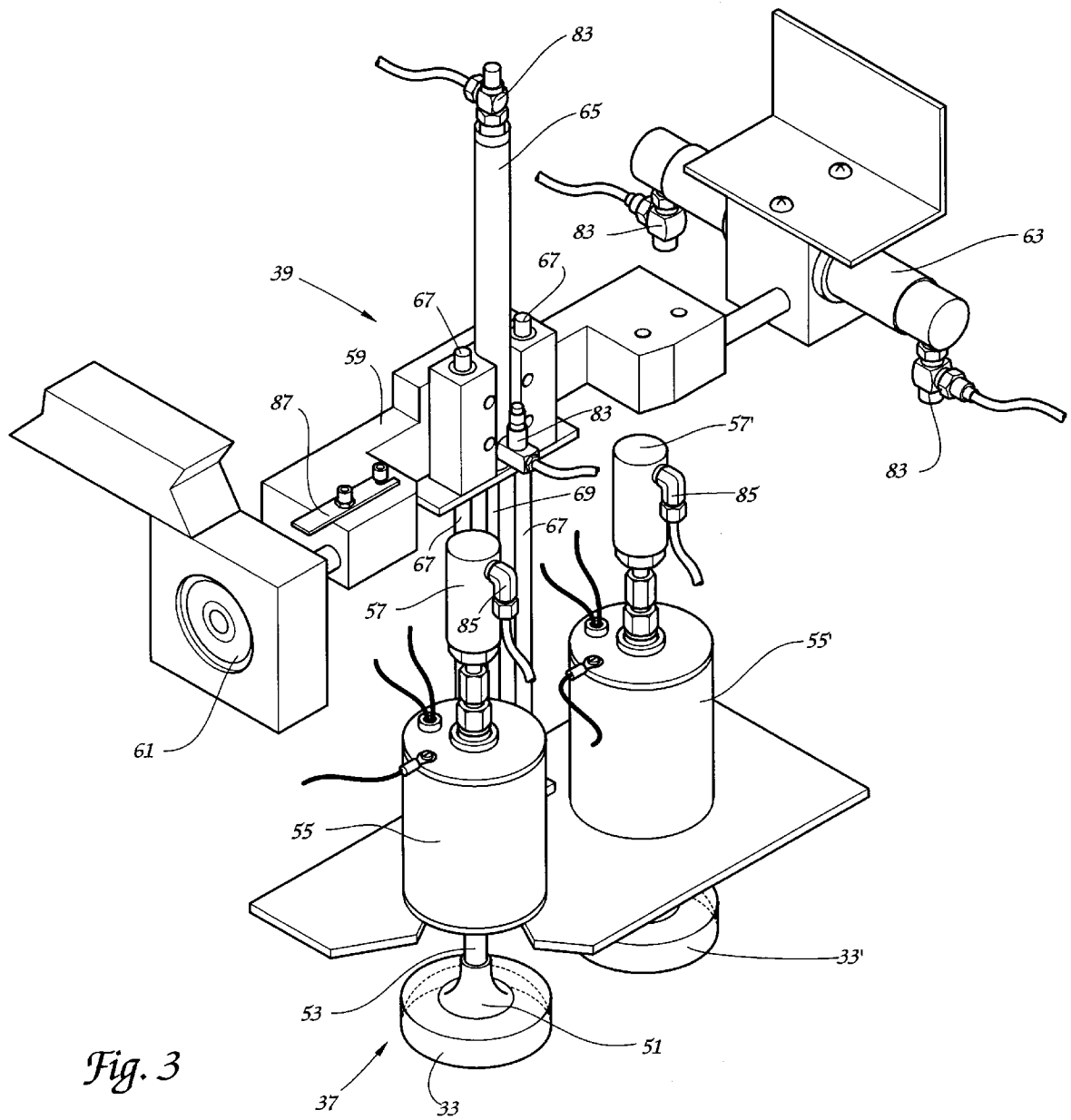
FIG. 3 is a detailed isometric view of the carriage and lens carrier of the present invention.

Carriage 39 also includes reciprocating drive 65, which is also conventional and, in a preferred embodiment, may be a compressed air drive such as an Ultramation Linear Thruster. Reciprocating drive 65 includes alignment rods 67 and drive rod 69 (see FIG. 3). Actuation of reciprocating drive 65 allows lens carriage 39 to move between a retracted position, as shown in FIG. 2, and an extended position, as shown in FIG. 3. Lens carriers 37,37' are operatively secured to carriage 39 by motor plate 71, on which are mounted spin motors 55,55', and is fixed to drive rod 69 and alignment rods 67 (see FIG. 3).

Turning to the exterior of apparatus 31, control panel 73 is provided for control of the apparatus by an operator. A conventional programmable logic controller (not shown) is connected to control panel 73 and acts to control and coordinate the movement and operations of the various components of the apparatus in a conventional manner. An electronic control module including three industrial timing chips and a voltage comparator chip operates with the controller to sense low current load sensor inputs via several 2N222 transistors, and provides output which the controller can process via several Omron 24 volt direct current telecommunication relays.

Lens tray 35, shown in FIG. 2 in its lens receiving position, includes lens positioning guides 77, which are circular pads resiliently mounted in tray 35 to assist the operator in centering lenses 33,33' for gripping by lens carriers 37,37'. Retractable door 78 can be opened to allow lenses 33, 33' to enter housing 49, or closed to keep out foreign matter. Staging shelf 79 is positioned below tray 35 for convenient placement of lenses in preparation for processing by the coating and curing apparatus 31. Tissue dispenser 81 provides a source of cleaning tissues for removing foreign matter from lenses prior to their processing.

Lens carriers 37,37' and carriage 39 are shown in greater detail in FIG. 3, in which reciprocating drive 65 is depicted in its extended position. Compressed air fittings 83 are connected to pivot drives 63 and reciprocating drive 65 to provide compressed air for operation of these components, and these fittings 83 are in turn connected to a supply of compressed air (not shown) which may be located externally of the apparatus 31. Vacuum fittings 85 are attached to vacuum fixtures 57,57' to supply negative air pressure to spindles 53,53' and vacuum cups 51,51' for gripping of lenses 33,33'. Photoelectric interrupter 87 (omitted in FIG. 2 for clarity) is mounted on pivot bar 59 to assist a conventional photoelectric sensor (not shown) in sensing of the position of pivot bar 59, so that the controller can be provided with information regarding the disposition of the components of the apparatus 31.

Figure 4:
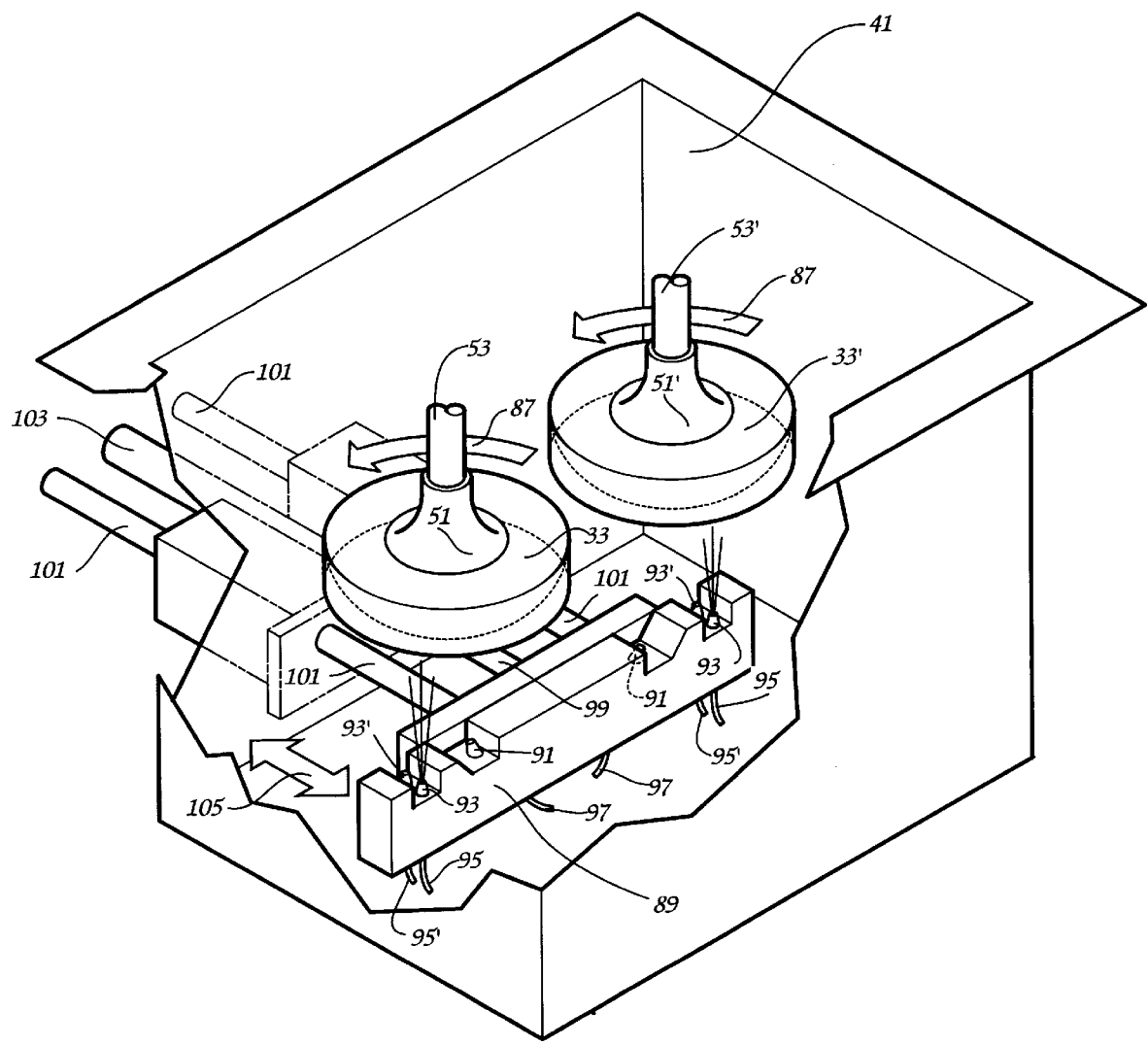
FIG. 4 is a detailed isometric view of the coating chamber and nozzle bar of the present invention.

The coating chamber 41 is shown in detail in FIG. 4, which depicts lenses 33,33' being spun on spindles 53,53', respectively, in the direction of arrows 87 and positioned within the coating chamber 41. Nozzle bar 89 includes air nozzles 91 and coating nozzles 93,93'. Coating nozzles 93 are shown spraying a fine stream of coating solution such as ACU-1500 by Sentilles Optical Services, onto lenses 33,33'. The two sets of coating nozzles 93,93' are, in the preferred embodiment, connected to separate coating solution tanks (not shown), so that two types of coating solution can be on hand for use in apparatus 31 or, if desired, the same solution can be used in both tanks with one tank and its corresponding set of nozzles operating as a back-up should the other tank and nozzles experience a breakdown or other difficulties. Coating nozzles 93,93' are connected to coating solution feed lines 95,95' which are, in turn, connected to the aforementioned coating solution tanks, while air nozzles 91 are connected by air lines 97 to a source of compressed air (not shown).

Nozzle bar 89 is mounted to drive rod 99 and alignment rods 101. Conventional drive cylinder 103, which drives rod 99 along the path shown by arrow 105 is, in the preferred embodiment, a compressed air drive such as the Bimba Linear Thruster. Nozzle bar 89 is thus driven along the path shown by arrow 105, which allows air nozzles 91 and coating nozzles 93,93' to have effective coverage of the entire exposed surface of lenses 33,33' while such lenses are spinning, as will be explained in more detail presently.

Figure 5:
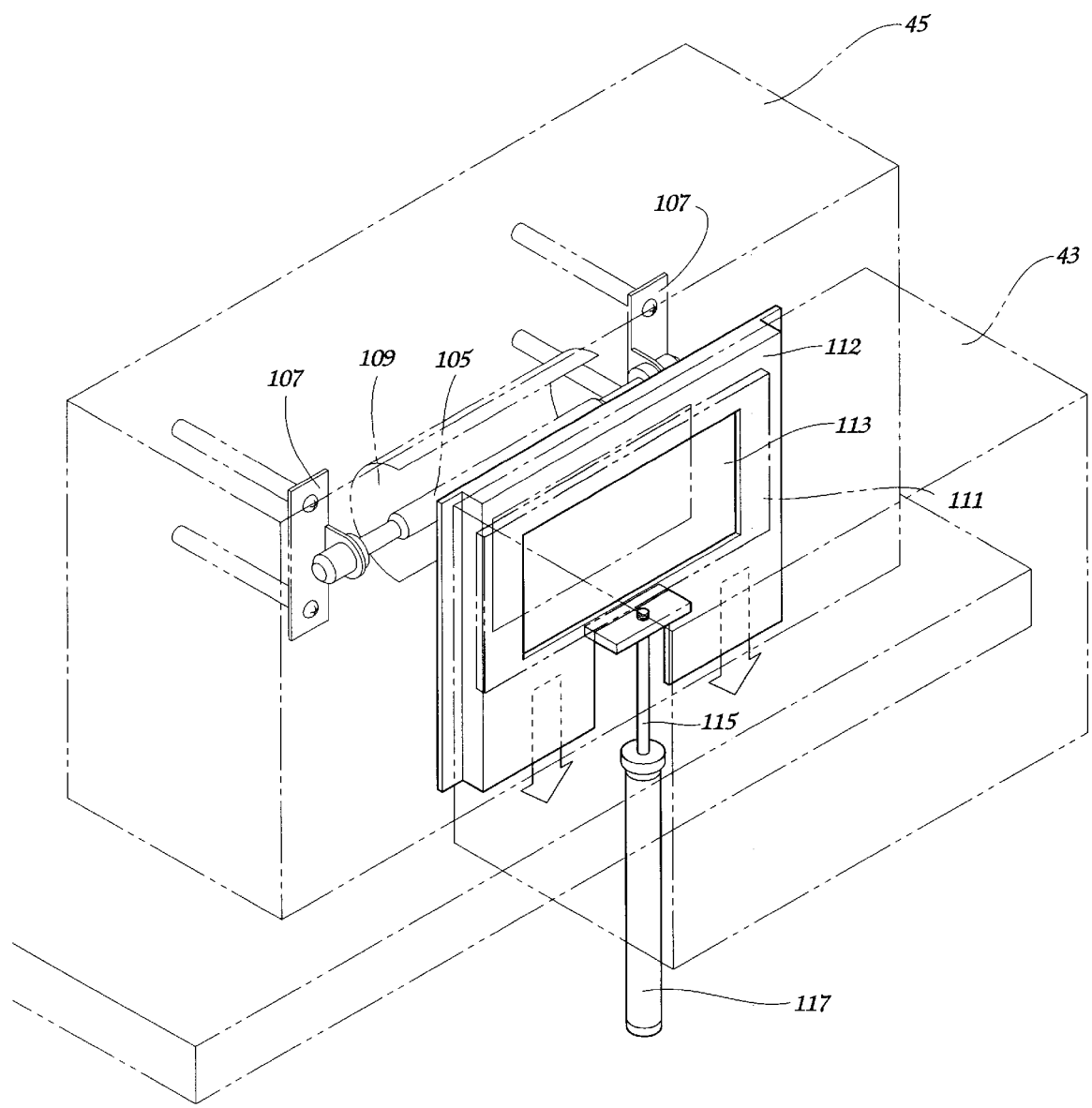
FIG. 5 is an isometric view of the lamp, aperture and shutter of the present invention, with the shutter in the closed position.

The coating chamber 43 and lamp chamber 45 are partially shown in FIG. 5. Ultraviolet lamp 105, lamp brackets 107, and reflector 109 are located in the lamp chamber 45 to provide an arrangement for projecting ultraviolet radiation into the curing chamber 43. Lamp 105 is a conventional ultraviolet radiation lamp, and in the preferred embodiment, has a rating of 200 watts per inch and a 4 inch length. The reflector 109 is constructed from specular-grade aluminum, and has an elliptical contour, although other arcuate contours could be used to provide various configurations for the reflected beam of radiation.

Shutter plate 111 is mounted in shutter guide 112 intermediate curing chamber 43 and lamp chamber 45, so as to selectively close or open aperture 113, thereby either blocking or allowing projection of ultraviolet radiation from the reflector 109 into the curing chamber 43. Shutter plate 111 is mounted on drive rod 115, which is in turn received in drive cylinder 117 to actuate movement of shutter plate 111 between its aperture opening and aperture closing positions. Lenses 33,33', which would be positioned in the curing chamber 43 during curing operations, have been omitted from FIG. 5 for clarity of illustration.

Figure 6:
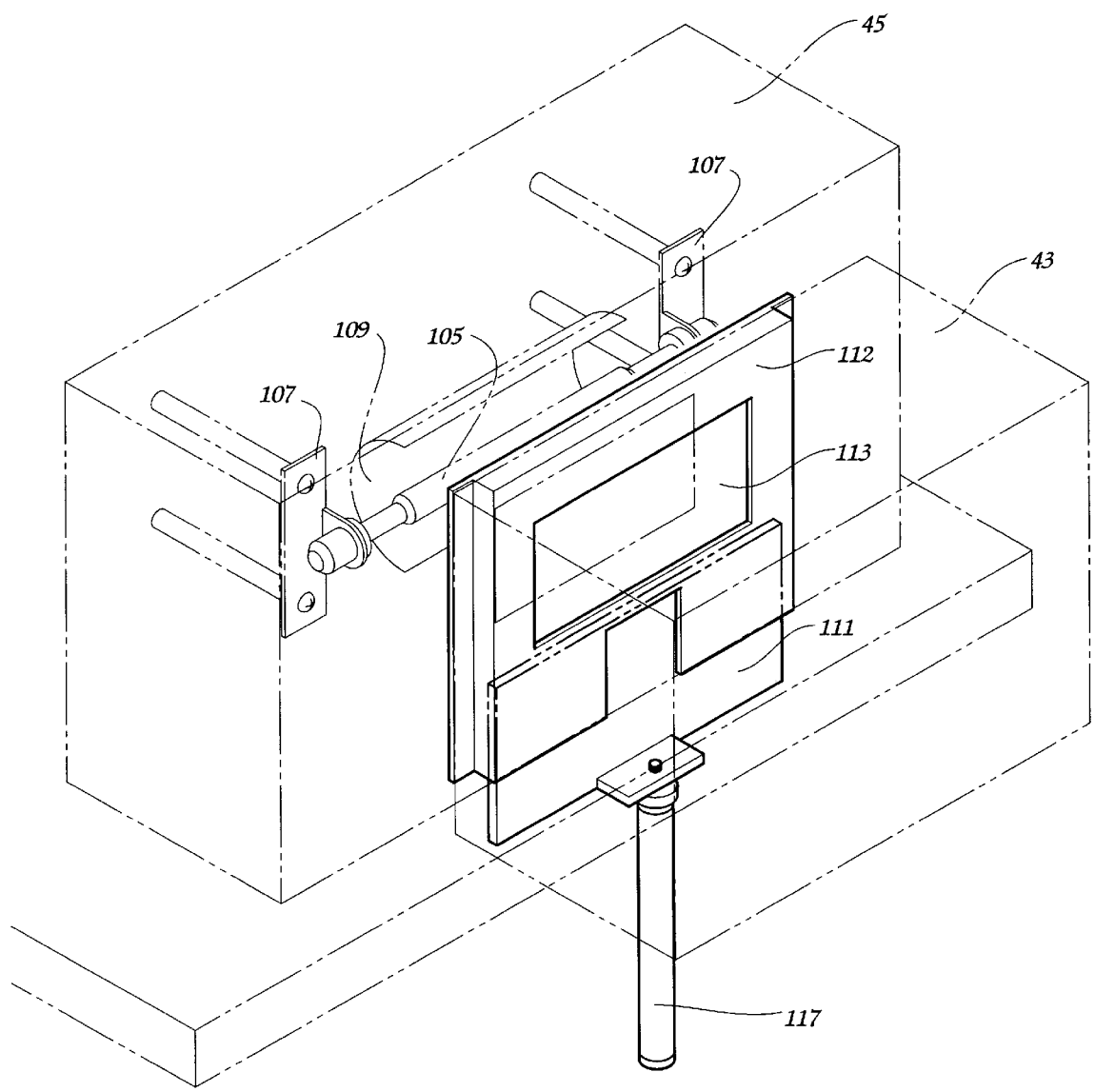
FIG. 6 is a view similar to FIG. 5 with the shutter in the open position.

In FIG. 6, the shutter plate 111 has been moved downwardly by a conventional drive cylinder 117 so that aperture 113 is open for projection of ultraviolet radiation therethrough. In the preferred embodiment, drive cylinder 117 is operated by compressed air, although other suitable drives may also be employed.

Figure 7:
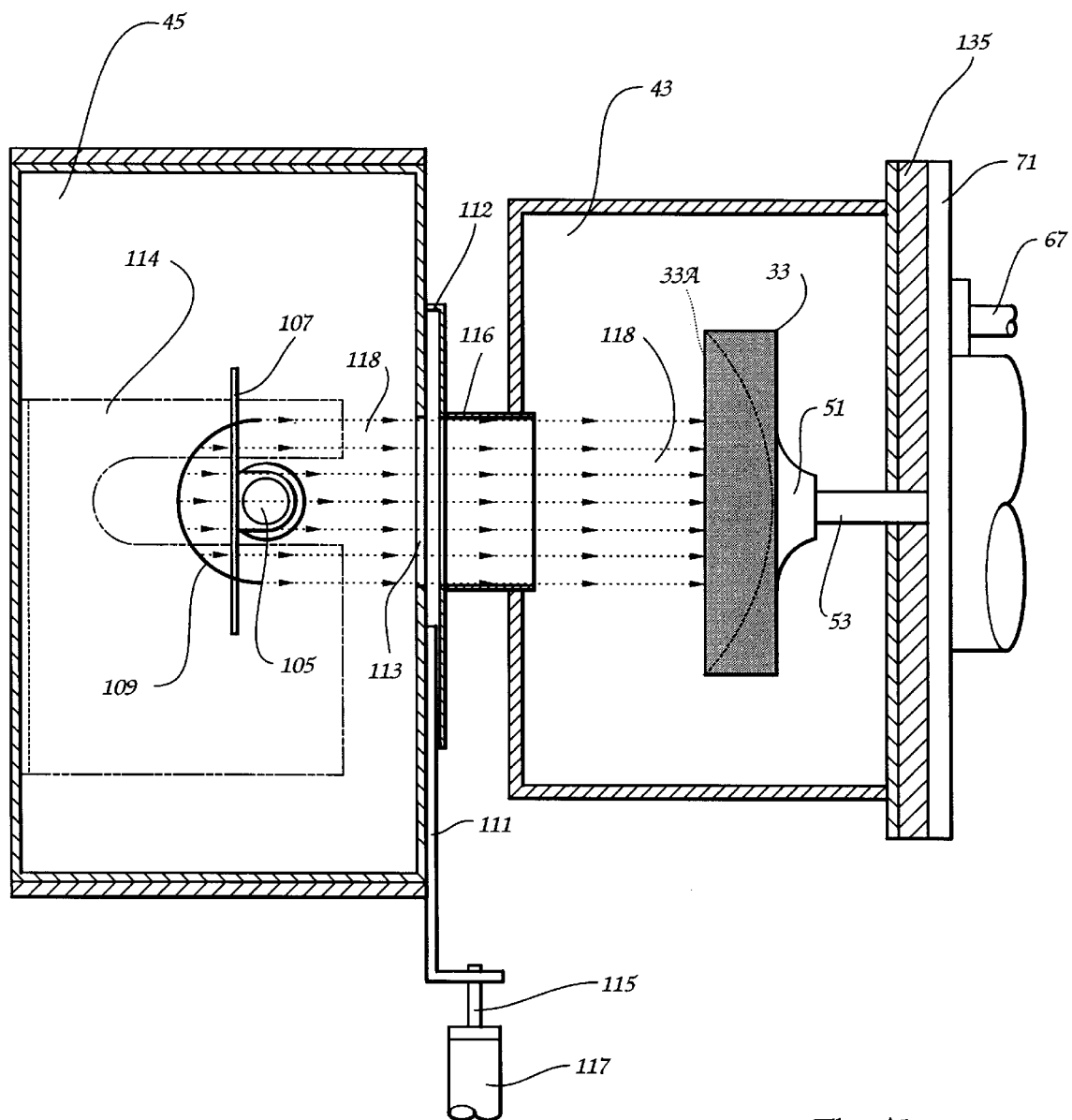
FIG. 7 is a diagrammatic view of the lamp chamber and curing chamber.

FIG. 7 shows the lamp chamber 45 and curing chamber 43 with lens 33 positioned therein for curing of the coating on the lens. Shutter plate 111 is in its open position, with radiation beam 118 being projected from reflector 109 through aperture 113 onto the lens 33. Director 116, which in the preferred embodiment forms an open rectangular tube, is positioned intermediate curing chamber 43 and shutter guide 112 so as to direct the radiation beam 118 into chamber 43 and onto the lens 33. Baffle 114 is arranged about the lamp 105 to prevent ventilating air circulating in lamp chamber 45 from immediately contacting the lamp 105, which may cause thermal shock. The ventilating system of the present invention will be discussed in more detail presently.

Figure 8:
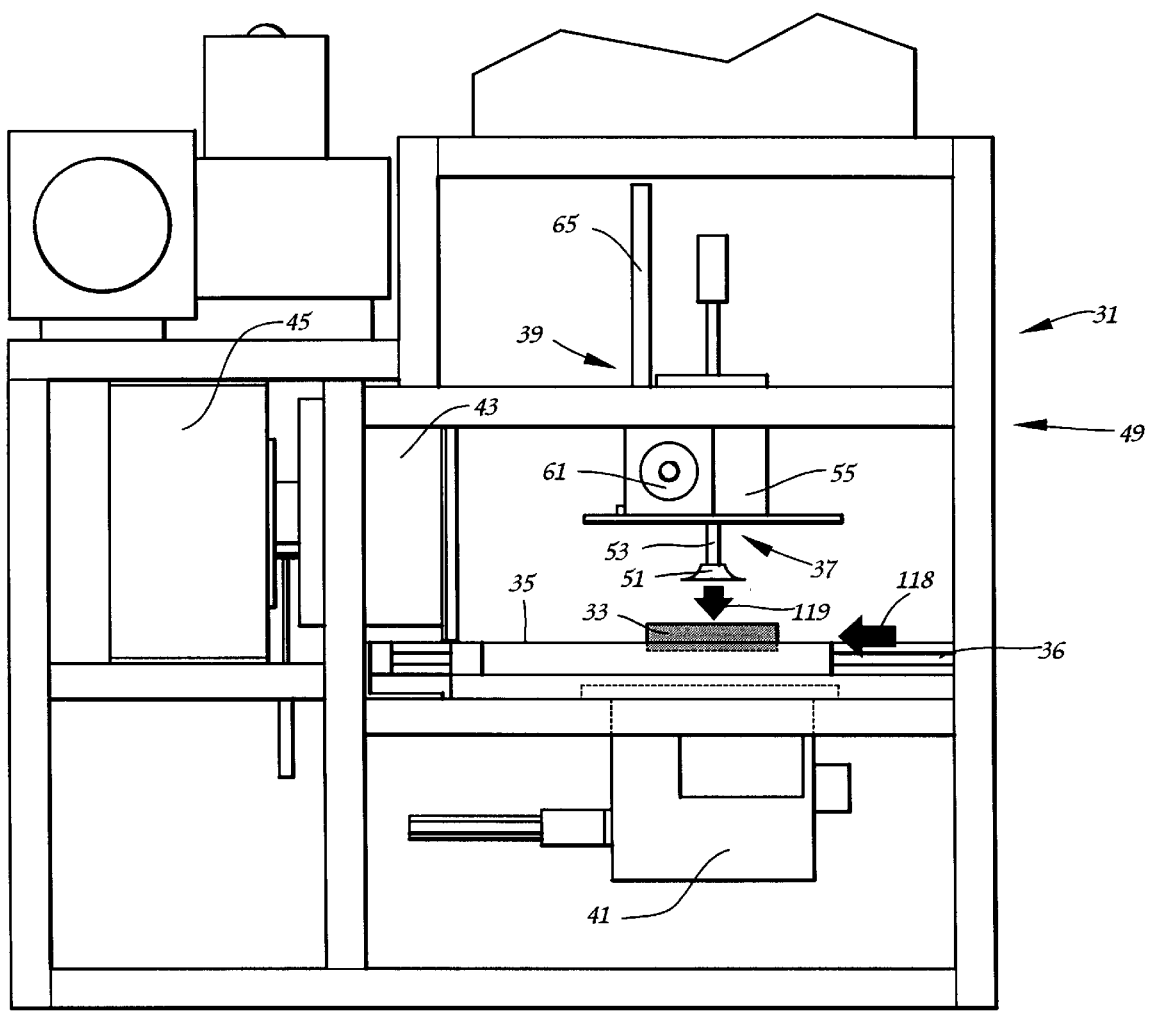
FIGS. 8–18 diagrammatically illustrate the sequential operation of the present operation.

FIGS. 8–18 diagrammatically illustrate the main steps in the production cycle in the coating and curing apparatus 31 of the present invention. In operation, the sequence of motion of the components of apparatus 31 is, as noted above, controlled by the programmable logic controller which also senses the location of such components through a series of conventional sensors (not shown) at appropriate locations in the apparatus. In FIG. 8, lens tray 35 has been moved by track drive 36 in the direction indicated by arrow 118 into position for gripping of the lens 33 by vacuum cup 51. The controller initiates downward movement of reciprocating drive 65 once lens tray 35 is in position and such downward direction of movement is indicated by arrow 119. At this point, vacuum is applied through vacuum fixture 57, spindle 53, and vacuum cup 51. Although a single lens 33 is shown in FIGS. 8–18, it will be understood that a second lens can be processed simultaneously, as shown for example in FIGS. 3–4.

Figure 9:
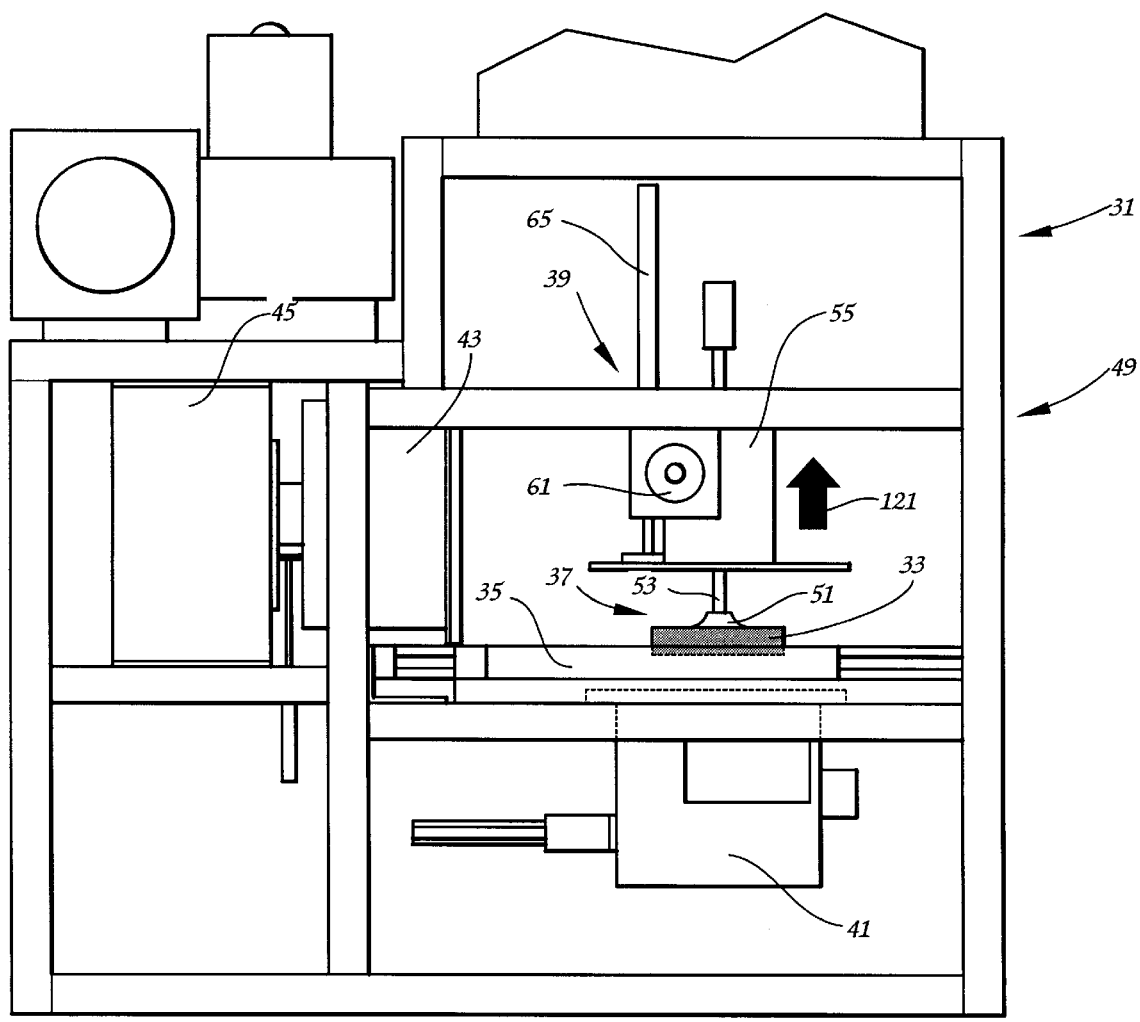

In FIG. 9, reciprocating drive 65 has moved downward so as to place vacuum cup 51 in contact with lens 33, and the vacuum applied through lens cup 51 has gripped lens cup 33 securely. The controller senses the increase in negative air pressure brought about by vacuum cup 51 gripping lens 33 and initiates an upward stroke of reciprocating drive 65 as indicated by arrow 121. Lens positioning guides 77,77' (see FIG. 2) which are, as previously noted, resiliently mounted, assist in the gripping of lenses 33,33' by compensating for different lens heights and thereby allowing two lenses of different heights to both be securely gripped by vacuum cups 51,51'. A taller lens will be contacted first during downward movement of lens cups 51,51', and the taller lens will be deflected downwardly as its lens positioning guide 77 or 77' resiliently yields and allows such movement. Once the lower lens is then contacted by its corresponding vacuum cup, both lenses will be gripped and can be moved upwardly for coating and curing steps in the apparatus 31.

Figure 10:
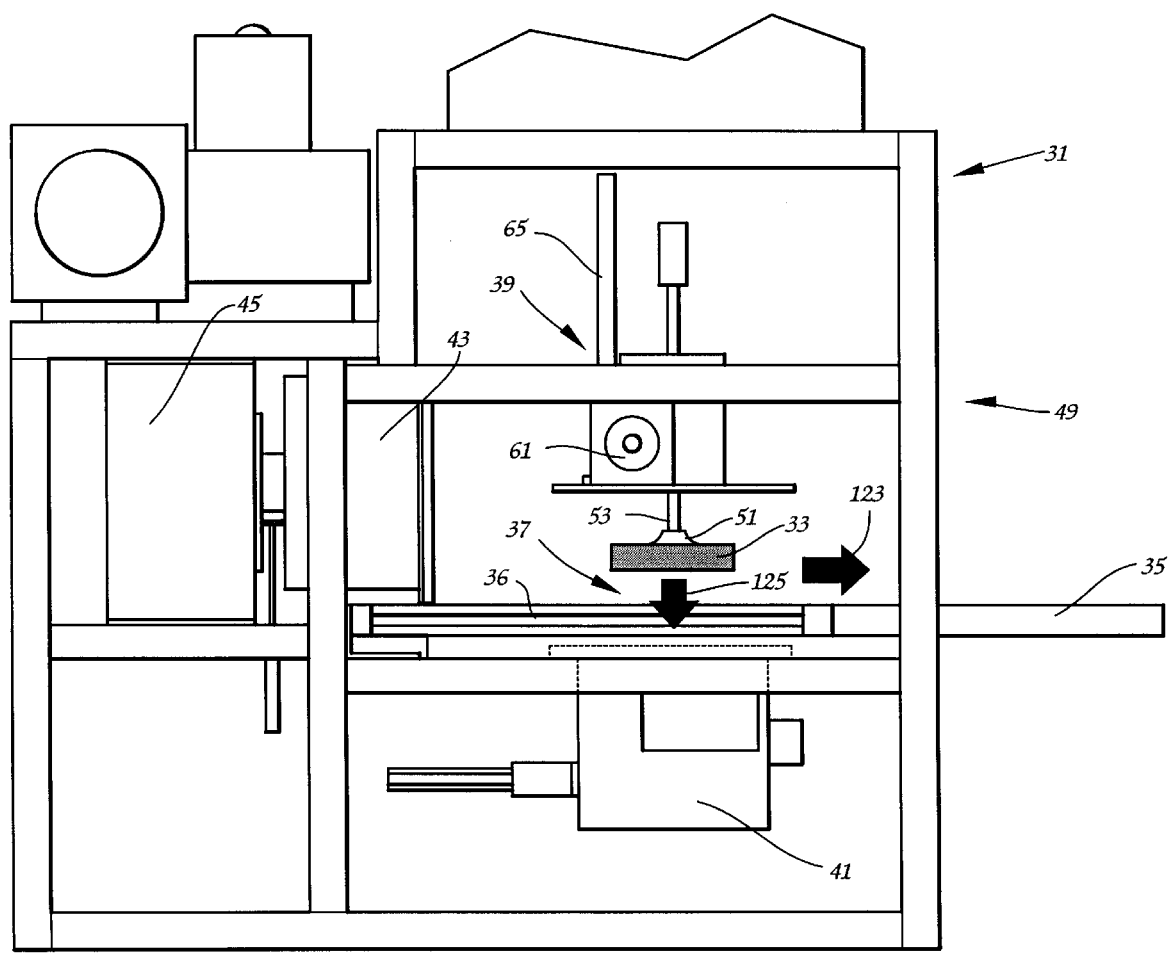

FIG. 10 shows the lens tray 35 having moved outwardly as indicated by arrow 123 to permit access to the coating chamber 41. The controller then initiates a downward stroke of reciprocating drive 65 to move lens 33 into coating chamber 41 as indicated by arrow 125.

Figure 11:
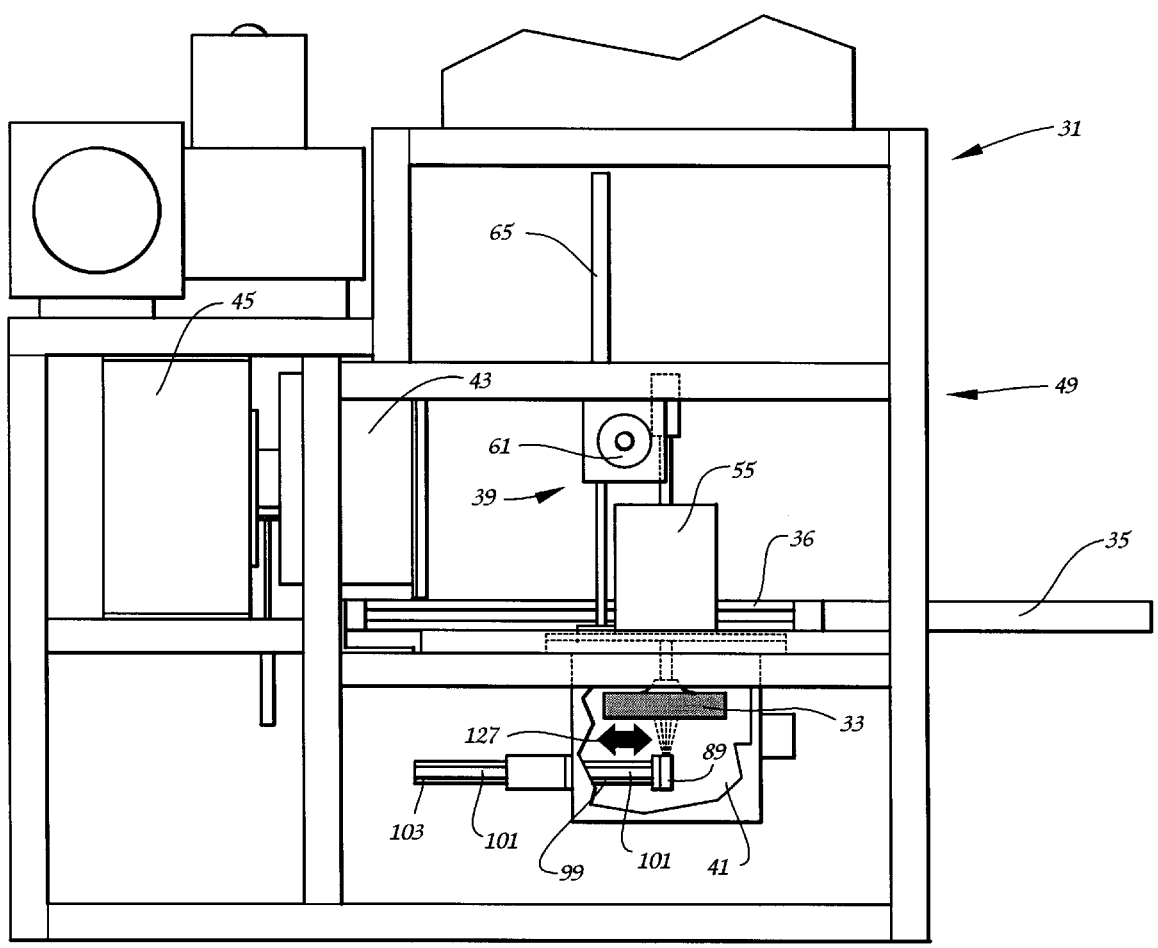

Cleaning of lens 33 by an air stream 125 from air nozzle 91 (see FIG. 4) is depicted in FIG. 11. The controller initiates spinning of lens 33 by spin motor 55 and causes nozzle bar drive cylinder 103 to move nozzle bar 89 along the path indicated by arrows 127, so that air stream 125 can completely clean the spinning lens 33. Cleaning of the lens 33 before coating helps to remove foreign matter which can cause defects in the coating. During the cleaning phase, lens 33 is rotated by spin motor 55 at 600 rpm, and nozzle bar 89 will make two passes along the path shown by arrow 127, from the center of lens 33 to the edge, and back to the center.

Coating of the lens, as shown in FIG. 4 and previously discussed, follows the cleaning phase. Rotational speed of the lens 33 is maintained at 600 rpm during coating of the lens 33. Nozzle bar 89 makes a single pass from the center of the spinning lens 33 to its edge so as to spray coat the entire inverted surface of the lens 33. Coating solution sprayed from nozzles 93 or 93' will be sprayed in a fine stream since spraying of the coating solution will be adversely affected if the solution is atomized.

Following application of the coating solution, the controller will act to increase the rotational speed of lens 33 to 1200 rpm for three seconds, and then to 1400 rpm for an additional three seconds to throw off excess coating solution from the lens. The lens 33 remains in the coating chamber 41 during this six second interval so that excess solution is thrown off inside the chamber 41 and not out into other areas of the apparatus 31.

Figure 12:
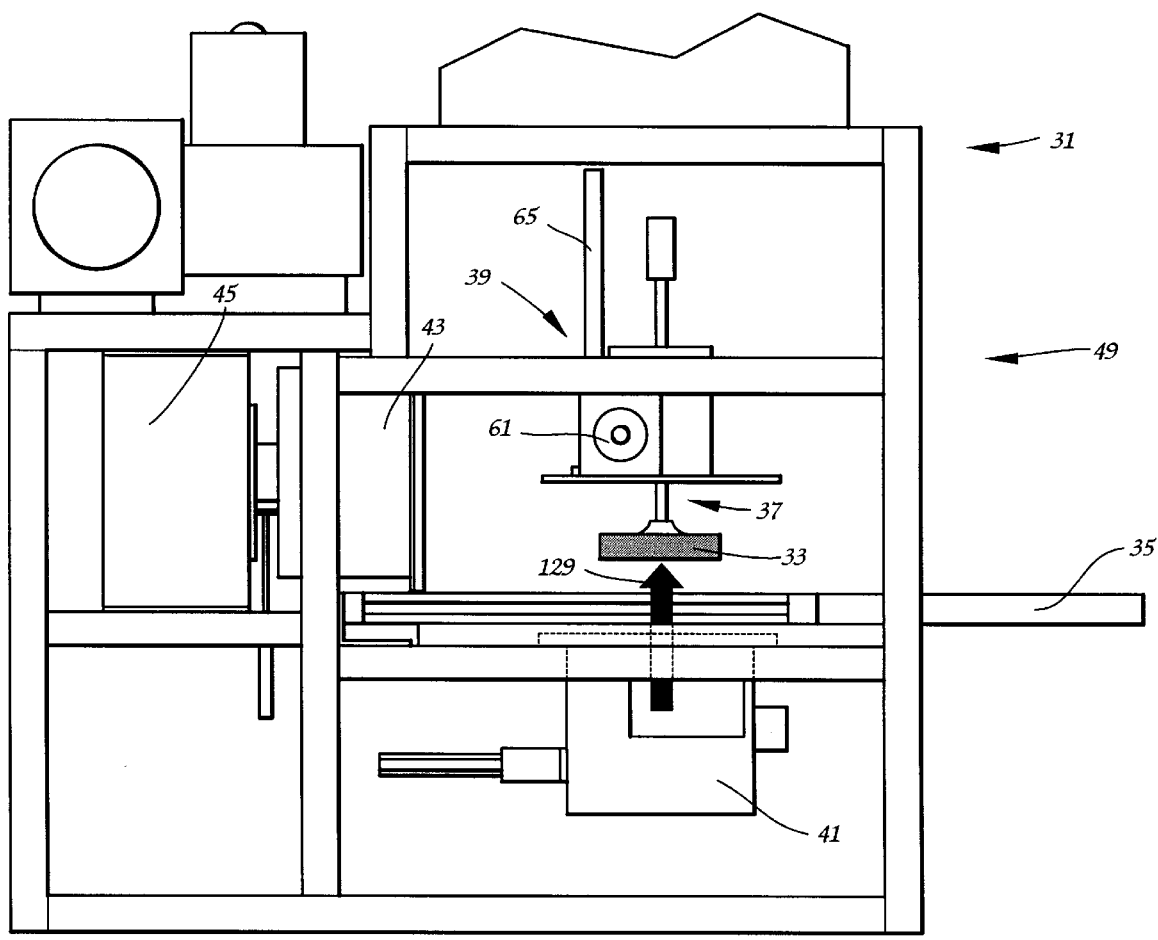
Figure 13:
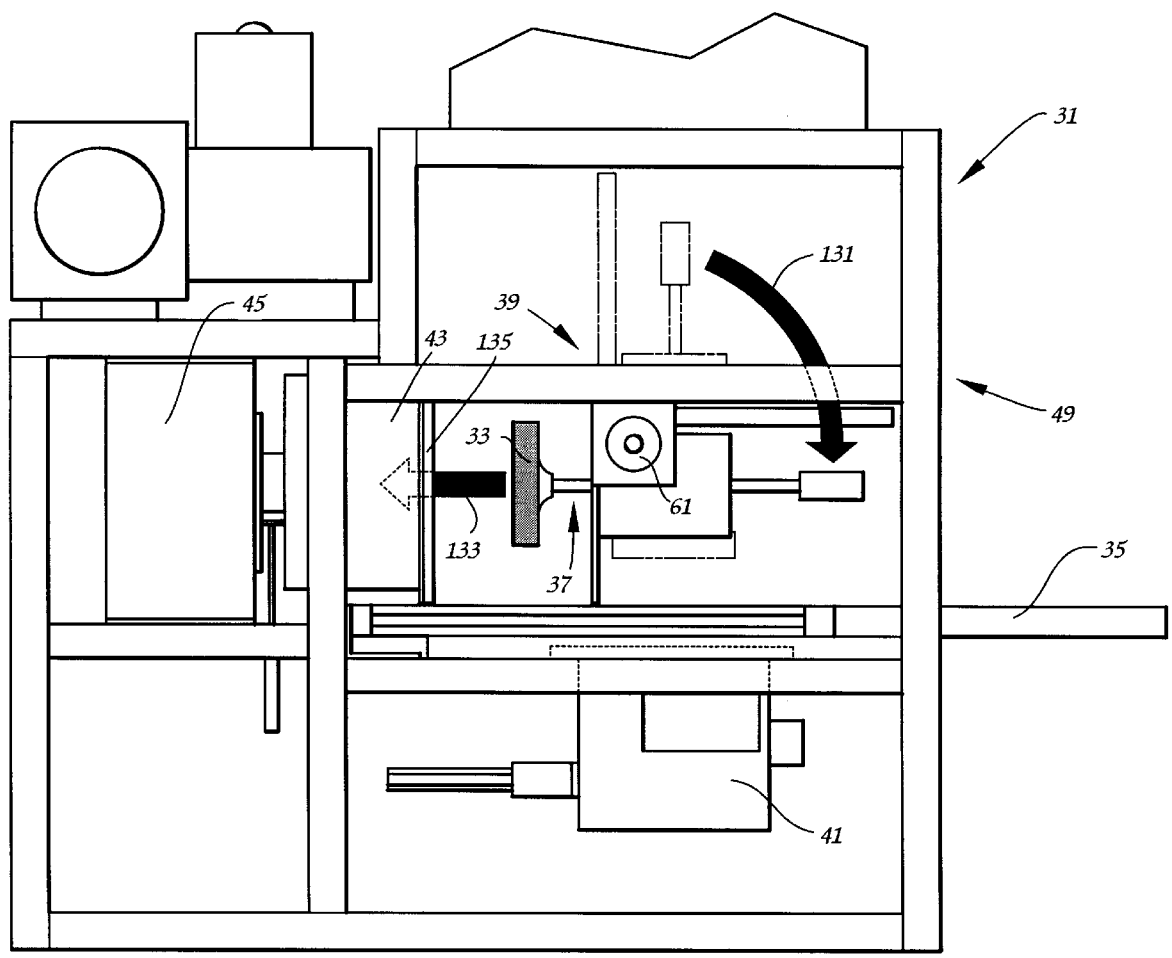

Following the six second spin-out interval, the reciprocating drive 65 operates to retract lens carrier 37 upwardly, removing lens 33 from the coating chamber 41, as depicted in FIG. 12. At this point, rotational speed of the lens 33 by spin motor 55 is slowed to 600 rpm. Once the reciprocating drive 65 completes its upward stroke, indicated by arrow 129, pivot drive 63 acts to drive pivot bar 59, and all components attached to it, along the arcuate path shown by arrow 131 in FIG. 13, and thereby orients the lens 33 in a vertical disposition. The accurate path of pivot bar 59 moves the lens carrier 37 from a position in which it is aligned with the coating chamber opening 120 to a position aligned with the curing chamber opening at gasket 135, which is oriented so that it is offset from coating chamber opening 120. The controller then actuates reciprocating drive 65 to move lens carrier 37 along the linear path shown by arrow 133.

Figure 14:
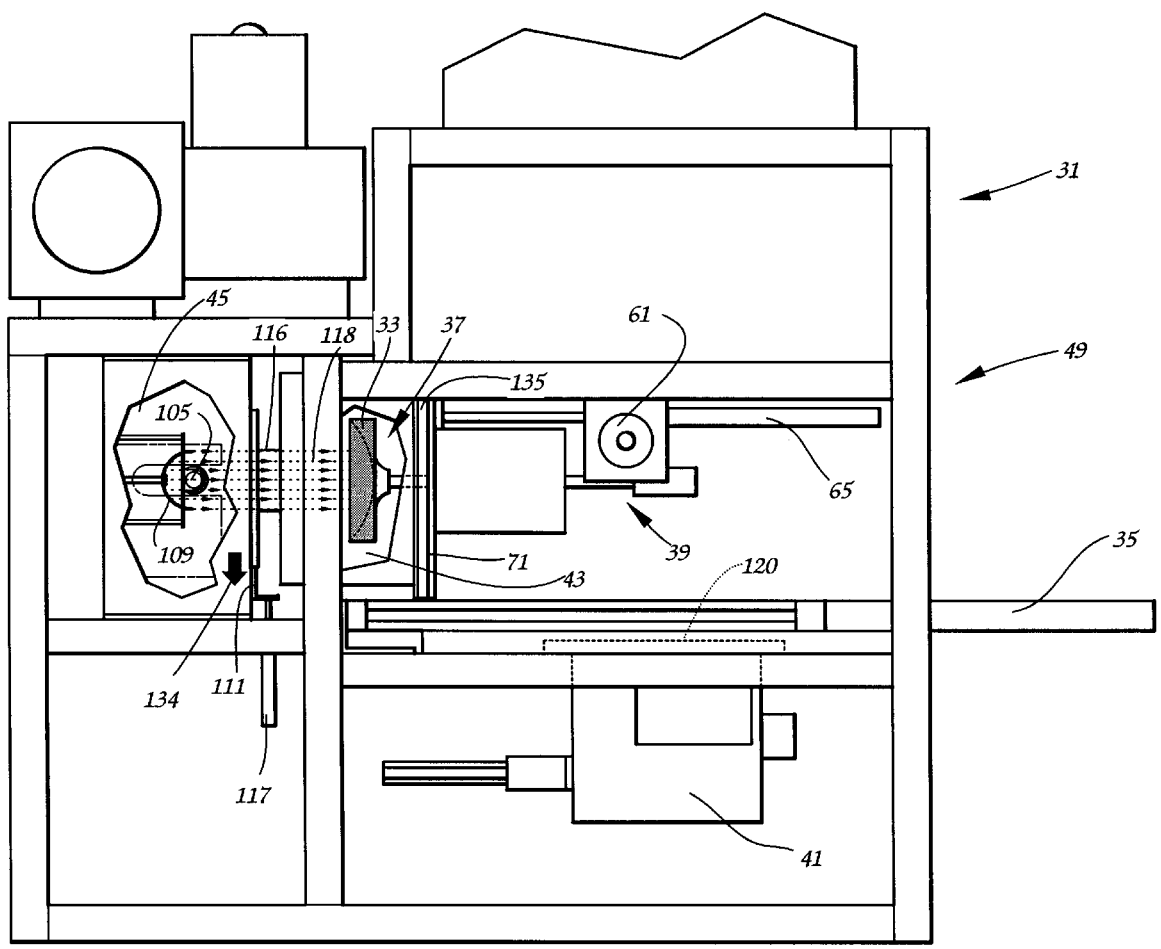

FIG. 14 shows lens carrier 37 fully extended into coating chamber 43, with motor plate 71 sealed against gasket 135 to create an ultraviolet radiation-proof barrier preventing radiation from reaching coating chamber 41, where liquid coating solution might be cured by such radiation to create solid clumps in chamber 41. Shutter plate 111 has been withdrawn by drive rod 115 and drive cylinder 117 in the direction indicated by arrow 134, so as to open aperture 113, thereby allowing projection of radiation from reflector 109 into curing chamber 43. The ultraviolet radiation beam 118 formed thereby is projected onto a portion of lens 33, which continues to spin at 600 rpm. The interior of coating chamber 43 and the portion of motor plate 71 which is exposed to ultraviolet radiation are coated with a non-reflective finish to reduce reflections within chamber 43. The shutter plate 111 remains open for a predetermined cure time, which in the preferred embodiment may be set anywhere from one-tenth of a second to thirty seconds. The total cure time, or time of exposure to ultraviolet radiation, will be selected based on the composition of the lens, coating solution, and lamp which is employed. In the preferred embodiment, for instance, a polycarbonate lens coated with ACU-1500 would preferably be exposed to ultraviolet radiation for fifteen seconds.

Figure 15:
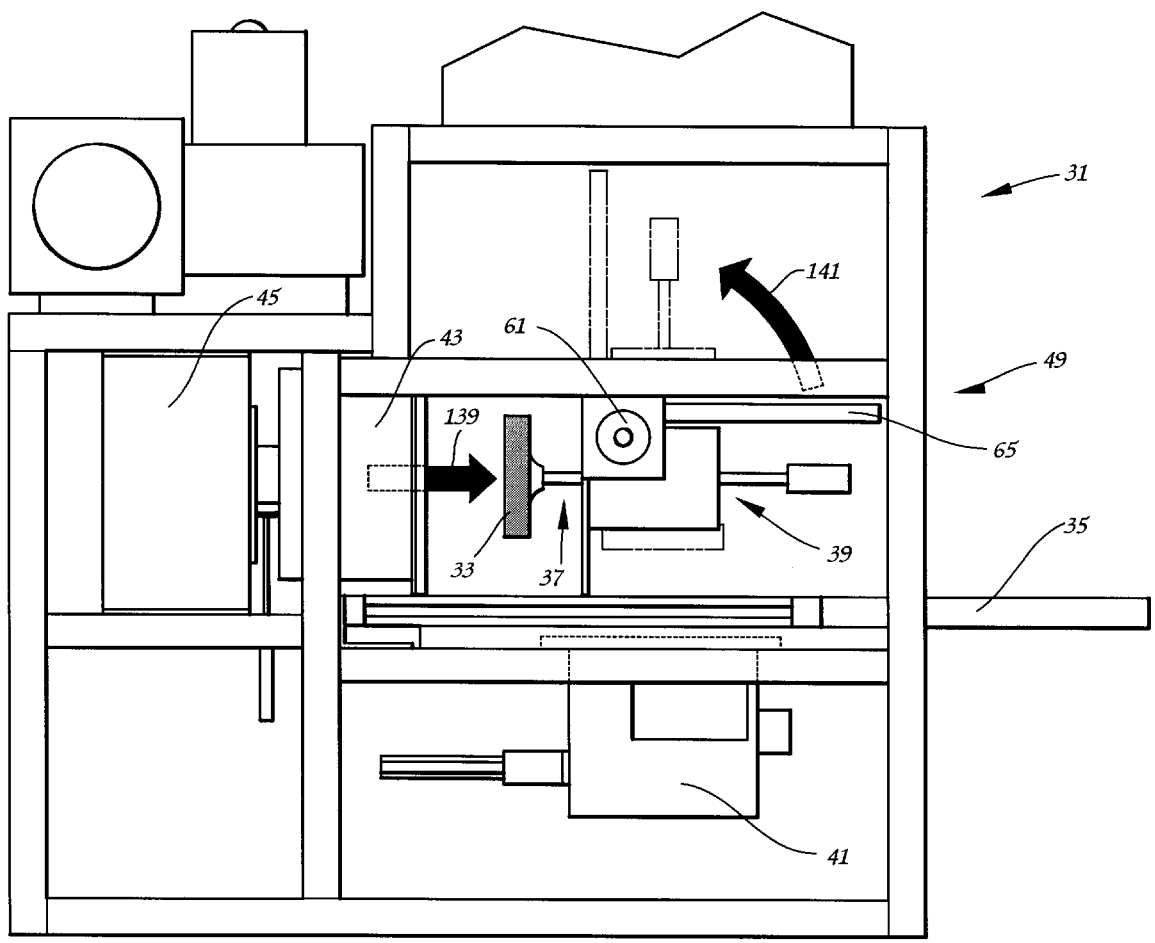
Figure 16:
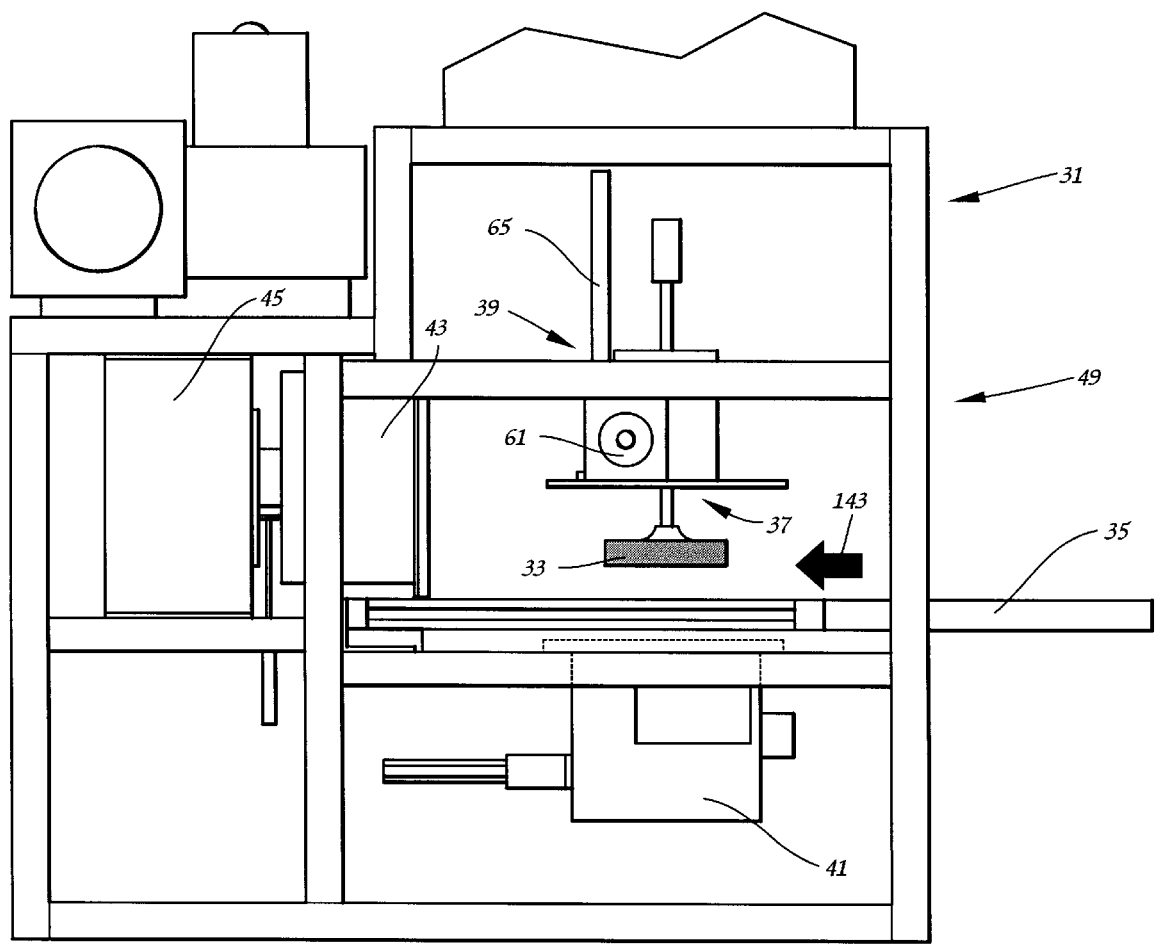

Following the curing of the coating on the lens 33, reciprocating drive 65 operates to retract lens carrier 37 from the curing chamber 43 along the path indicated by arrow 139, as depicted in FIG. 15. The controller then actuates pivot drive 63 to pivot the lens carrier 37 along the arcuate path indicated by arrow 141 back into its upright position. Once the lens carrier 37 has reached its upright position, the controller causes spinning of the lens carrier 37 and the lens 33 by the spin motor 55 to cease. As shown in FIG. 16, lens tray 35 begins to move in the direction indicated by arrow 143 into the interior of the apparatus 31 and reciprocating drive 65 is actuated to move lens carrier 37 downwardly.

Figure 17:
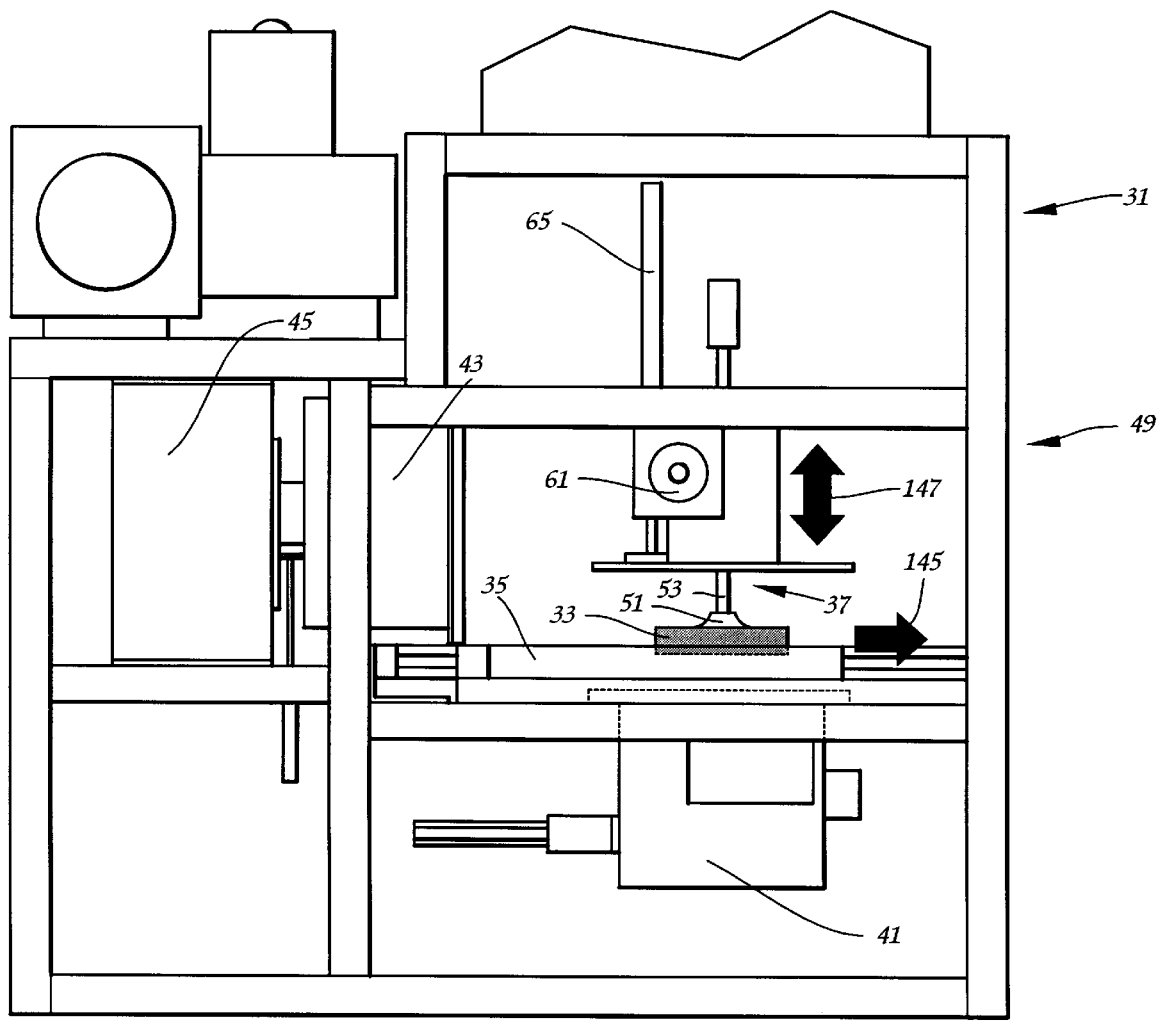
Figure 18:
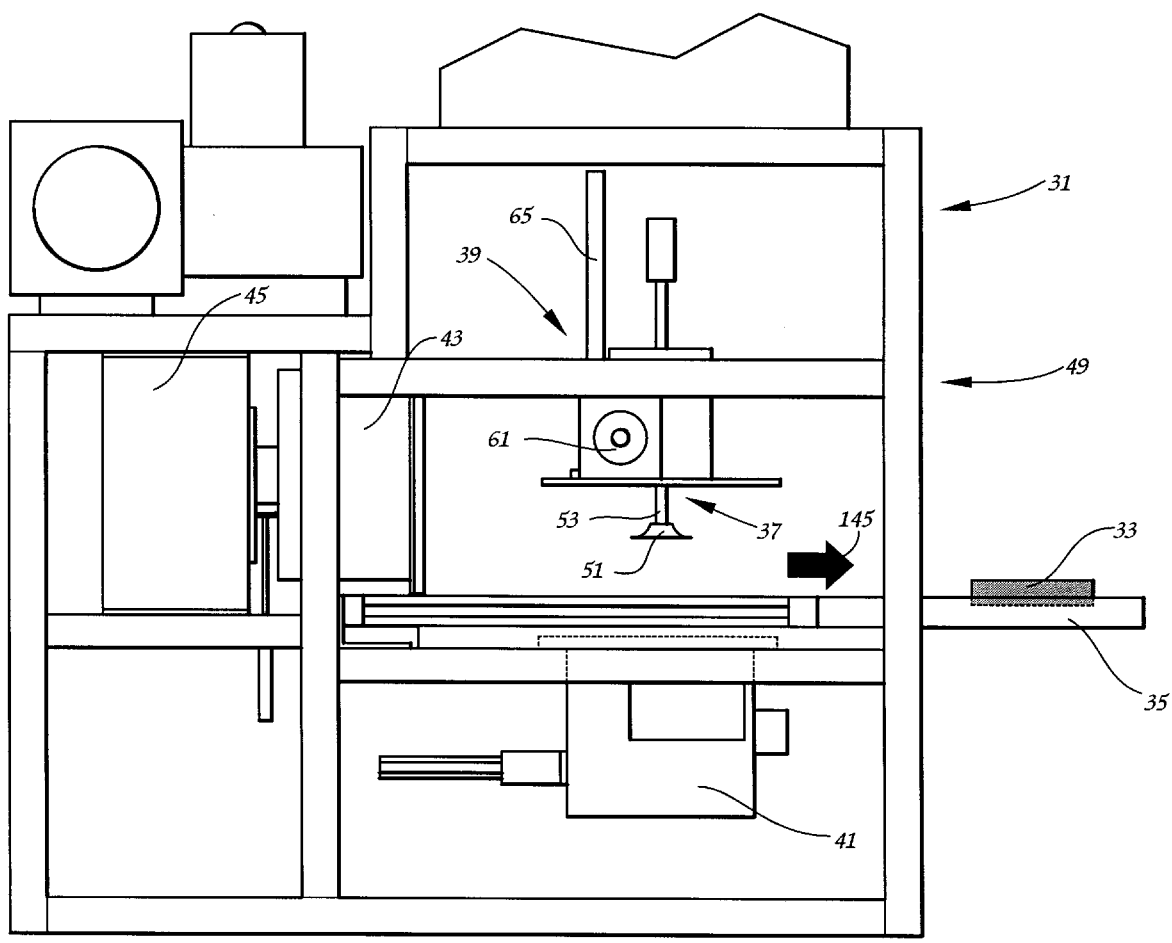

The downward stroke of reciprocating drive 65 places lens 33 on the lens tray 35, as depicted in FIG. 17, and the controller causes the negative air pressure supplied to vacuum fixture 57 to cease, thereby releasing lens 33 from vacuum cup 51. Reciprocating drive 65 then initiates an upward stroke to retract the lens carrier 37 in the direction indicated by arrow 147, and lens tray 35 moves outward as indicated by arrow 145. The completion of a production cycle is shown in FIG. 18, with the lens tray once again positioned outside the housing 49, with the lens 33, its coating completely cured, ready to be picked up by the operator of the apparatus 31.

Figure 19:
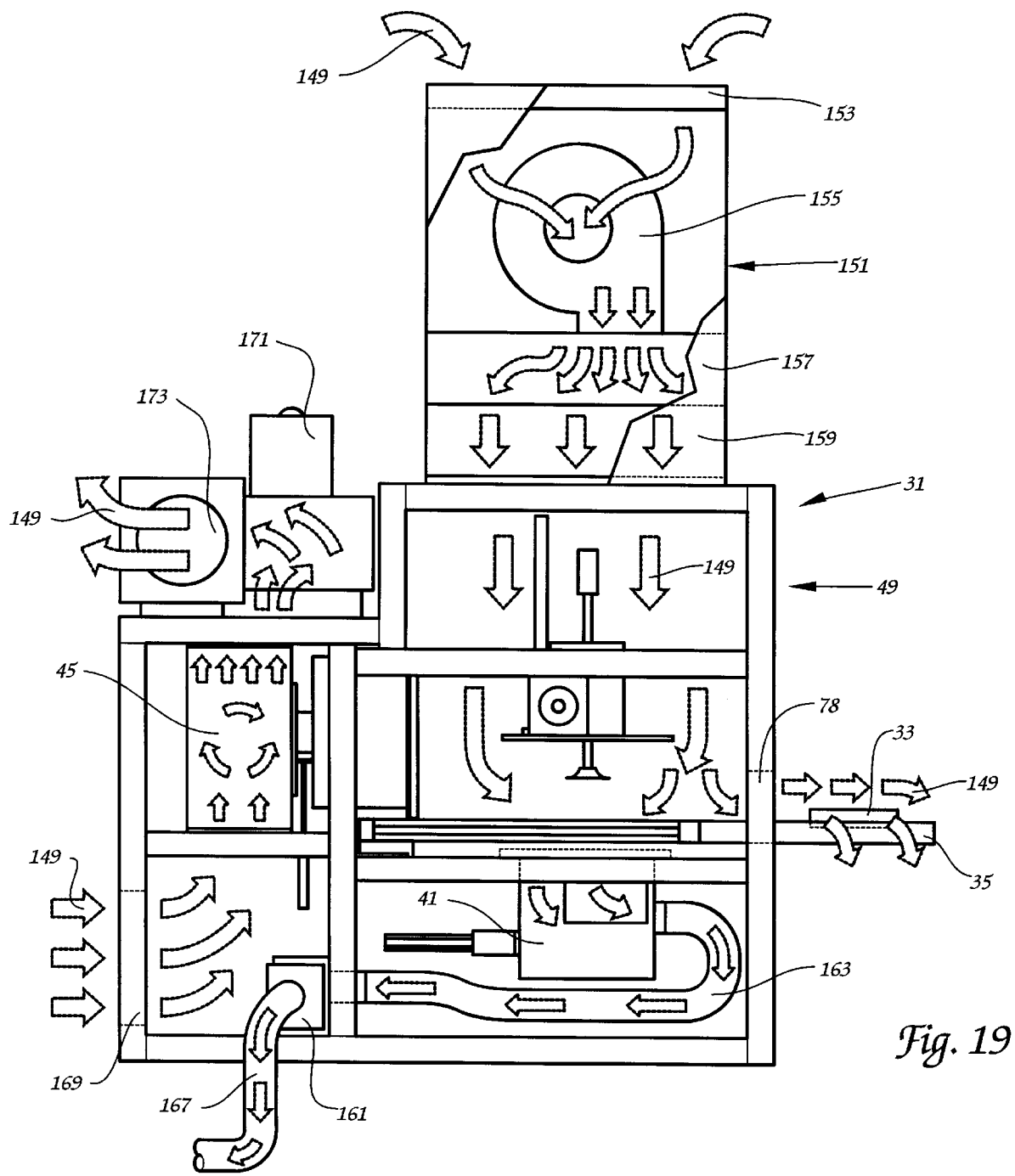
FIG. 19 is a diagrammatic view of the present invention showing the path of ventilating air as it passes through the apparatus.

The ventilation system of the preferred embodiment of the present invention is shown in FIG. 19, with air flow arrows 149 depicting the flow of ventilating air through the apparatus 31. Ventilating air enters air cleaning unit 151 through pre-filter 153 and is drawn into blower 155, then blown into plenum 157, through HEPA filter 159, and into the interior of housing 49. A portion of the ventilating air exits the housing 49 through the door 78, which is situated in its closed position so as to provide a gap for outward passage of air, so that ventilating air may flow outwardly while door 78 is in either its closed or open position, and such air may then flow over a lens 33 positioned on lens tray 35 to prevent deposition of foreign matter on the lens. Ventilating air enters coating chamber 41, and is drawn by blower 161 into duct 163 and exhausted out of the apparatus 31 through exhaust tube 167. Ventilating air is also drawn by exhaust blower 171 into the apparatus 31 through air inlet 169, which is positioned to provide ventilating and cooling air to lamp chamber 45, where the operating temperature of ultraviolet radiation lamp 105 (see FIG. 7) may exceed 800° F., and the ventilating air in the lamp chamber 45 is drawn upwards by blower 171 and expelled through exhaust outlet 173.

Operation of ultraviolet radiation lamps, such as the lamp 105 employed in the preferred embodiment of the present invention, consumes a significant amount of power, and such lamps are expensive. The power consumption and cost of such lamps also increases dramatically for larger lamps, which can irradiate larger areas. The apparatus 31 of the present invention employs an arrangement which permits only a portion of the lenses 33, 33' to be exposed to ultraviolet radiation at any one time, thus allowing the use a smaller, less expensive and more cost-efficient lamp.

Figure 20:
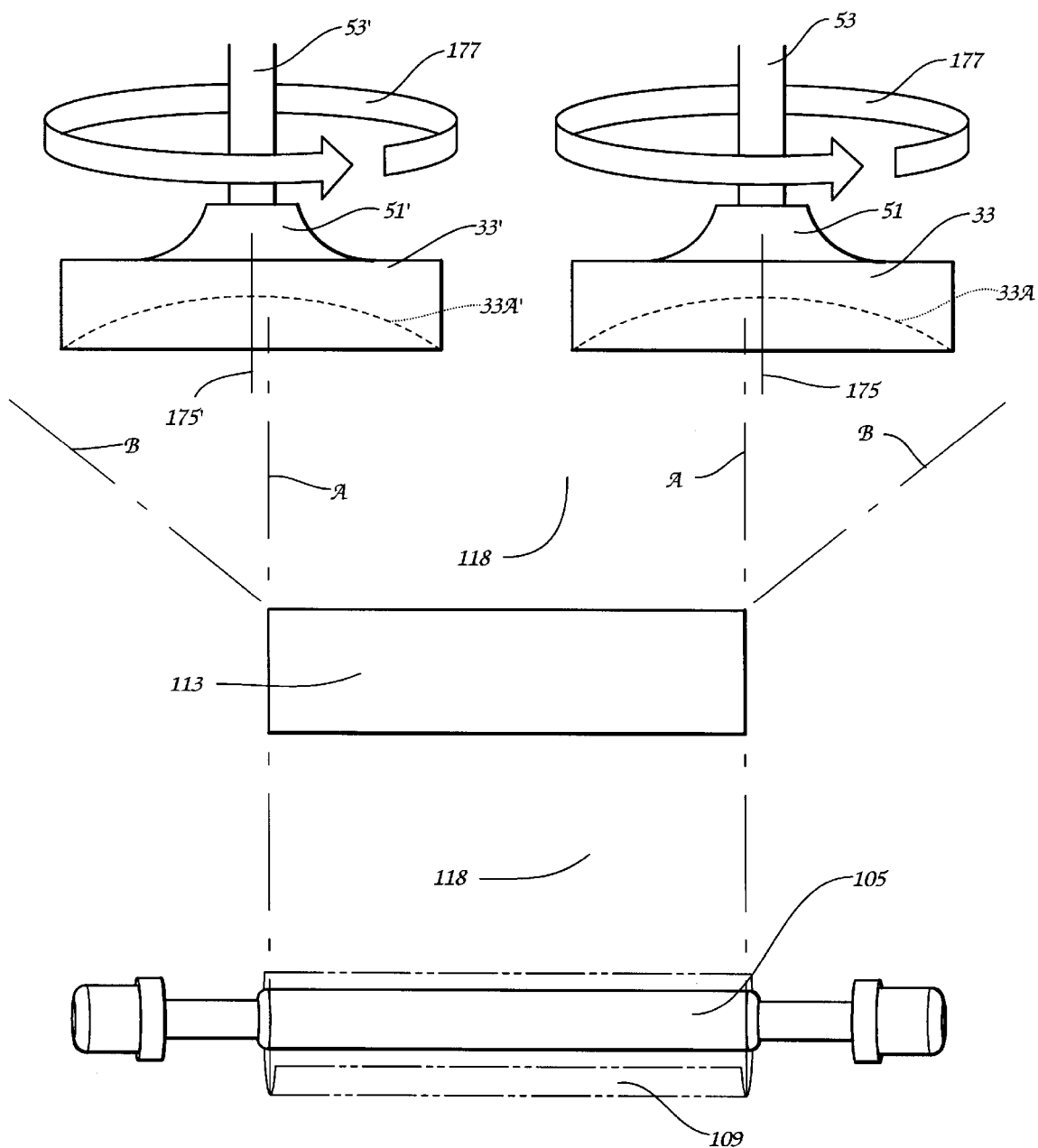
FIG. 20 is a diagrammatic view showing the ultraviolet lamp and reflector of the present invention projecting a beam of radiation through the aperture so as to form a zone of maximum intensity of ultraviolet radiation to irradiate predetermined portions of two coated lenses.

FIG. 20 diagrammatically depicts the ultraviolet radiation lamp 105 and the reflector 109 projecting a beam 118 of ultraviolet radiation through aperture 113 to form a zone of maximum ultraviolet radiation intensity in the area substantially bounded by and between lines A, and zones of lesser ultraviolet radiation intensity in the areas substantially bounded by and in between lines A and B. Spindles 53, 53', which rotate about their respective center lines 175, 175' as indicated by arrows 177, support, as set out above, vacuum cups 51, 51' and lenses 33, 33'. Thus, lenses 33, 33' also rotate about center lines 175, 175' during their exposure to the ultraviolet radiation beam 118.

As shown in FIG. 20, the zone of maximum intensity A—A extends across only portions of lenses 33, 33' and does not extend to center lines 175, 175', which are situated offset from and outside of the zone A—A. As lenses 33, 33' rotate during their exposure to ultraviolet radiation beam 118, at any one moment only portions of the lenses are therefore exposed to the zone of maximum intensity A—A and at each moment new portions of the lenses enter the zone A—A as other portions leave the zone A—A. Lenses 33, 33' have concave coated surfaces 33A, 33A' positioned for curing of their coatings, and lenses having other surface contour could also have their coatings cured in the efficient curing arrangement of the present invention.

This arrangement allows the use of a smaller, less powerful ultraviolet radiation lamp 105 which need not have sufficient wattage to simultaneously expose the full coated surfaces of the lenses 33, 33'. Center lines 175, 175' are situated outside the zone of maximum intensity A—A so that the portions of the lenses 33, 33' at the center lines 175, 175' are not continuously exposed to such maximum intensity of ultraviolet radiation. Since the centers of the rotating lenses have low or essentially no relative movement during the rotation, the central area of the lenses 33, 33' would be continuously within the maximum intensity of ultraviolet radiation if located within zone A—A, resulting in over-curing of the coating on the central portions of the lenses and a defective product. Curing of the coating on the lenses at center lines 175,175' is accomplished by the less intense ultraviolet radiation within zones A—B, which does not cause over curing of the coating despite the continuous presence of center lines 175,175' within these zones during the cure time.

Figure 21:
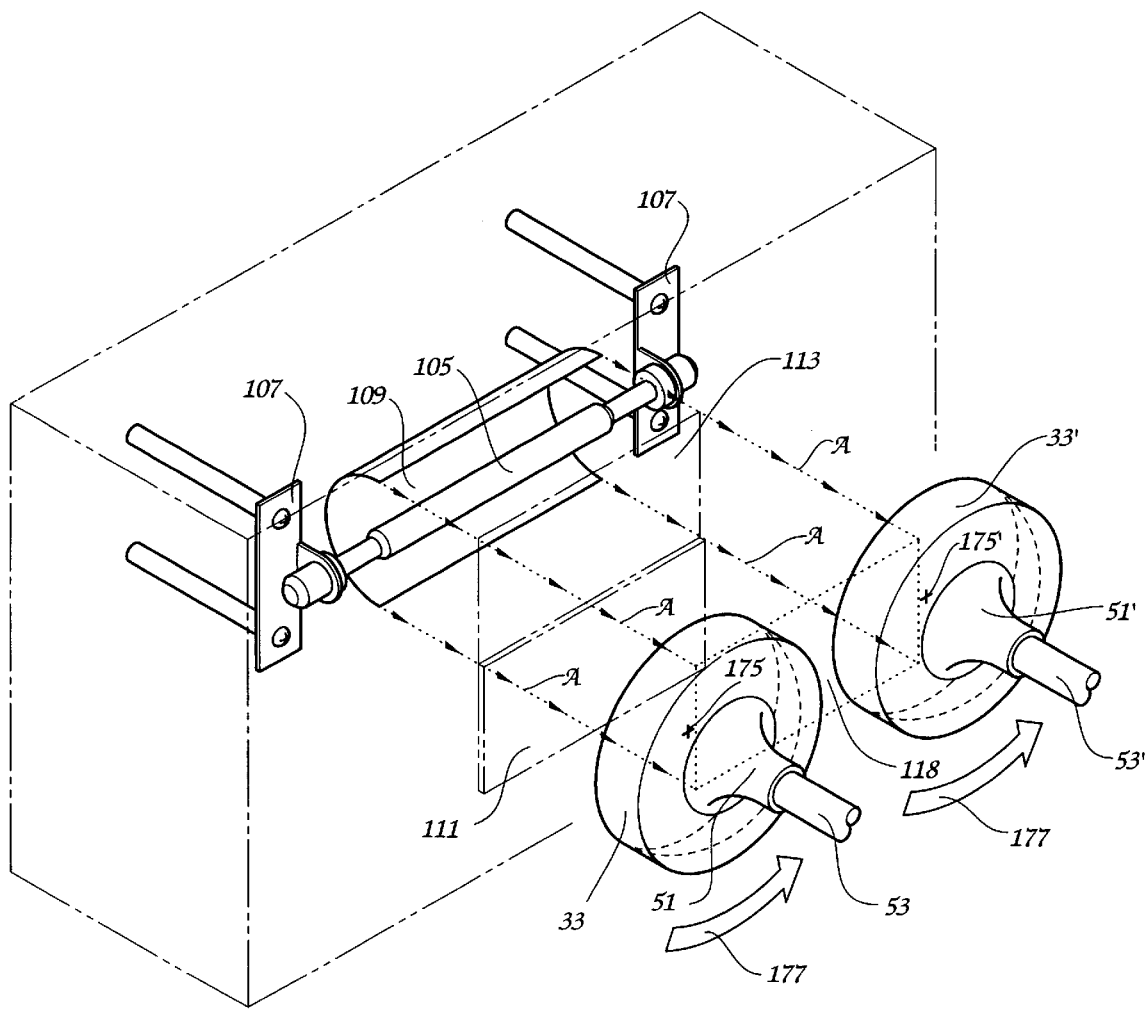
FIG. 21 is an isometric view similar to FIG. 19, showing a zone of maximum intensity of ultraviolet radiation projected onto two coated spinning lenses for curing of their coatings.

The zone of maximum intensity A—A is also depicted in FIG. 21, which shows the portion of the lenses 33, 33' exposed to the zone of maximum intensity A—A at any one time. Spinning of the lenses about centers 175, 175', and orientation of centers 175, 175' in offset relation to zone A—A thus insures that the entire lenses are properly cured, but avoids the aforementioned over-curing of the center area and the anomalies in the lens coatings which would result therefrom.

The present invention thus provides for efficient coating of lenses and curing of the coatings within a compact space, while advantageously orienting the lenses in an inverted disposition during coating operations and then a vertical disposition during curing operations. Operation of the present invention is simple for the operator, yet does not require highly complex and expensive industrial robots or other devices for handling of the lenses. Moreover, the present invention can employ a relatively small and inexpensive ultraviolet radiation lamp which does not excessively consume electricity, yet curing of the lenses can be reliably accomplished without defects and over-curing.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An apparatus for coating a lens and curing the coating on the lens, comprising:

a lens carrier for gripping and holding the lens;

a housing having first walls defining a coating chamber with an opening in one of said first walls, and said housing having second walls defining a curing chamber with an opening in one of said second walls;

means for applying a coating to the lens within said coating chamber;

means for projecting ultraviolet radiation within said curing chamber for curing the coating on the lens;

means for selectively blocking the ultraviolet radiation from passing into said coating chamber; and a carriage for supporting said lens carrier and the lens held thereby and moving said lens carrier and the lens along a predetermined path of motion within said housing, said path of motion moving said lens carrier and the lens through said coating chamber opening into said coating chamber so that the lens is supported in an inverted disposition during coating of the lens by said means for coating, and moving said lens carrier and the lens through said curing chamber opening into said curing chamber so that the lens is supported in a vertically oriented disposition during curing of the coating on the lens by the ultraviolet radiation.

2. The coating and curing apparatus of claim 1 wherein said lens carrier includes a spindle having an end and a cup mounted on said end for holding the lens.

3. The coating and curing apparatus of claim 2 wherein said spindle is hollow and has a central longitudinal spindle axis, said cup is a vacuum cup having a central opening communicating with the interior of said hollow spindle and further including means for applying negative pressure through said hollow spindle and said cup opening for gripping and holding the lens.

4. The coating and curing apparatus of claim 2, wherein said spindle has a central longitudinal spindle axis, and further including means for spinning said spindle about said spindle axis.

5. The coating and curing apparatus of claim 1 wherein a second lens carrier is provided for gripping and holding a second lens.

6. The coating and curing apparatus of claim 1 wherein said housing defines a tray opening and further including a tray slidably mounted for movement between a receiving position for receiving a lens outside said housing and a lens gripping position inside said housing for gripping of the lens received on said tray by said lens carrier.

7. The coating and curing apparatus of claim 6 wherein said tray includes a lens positioning guide for positioning said lens to be gripped by said lens carrier.

8. The coating and curing apparatus of claim 7 wherein said lens positioning guide is resiliently mounted on said tray.

9. The coating and curing apparatus of claim 6 wherein said tray includes a resiliently mounted lens height compensator.

10. The coating and curing apparatus of claim 1 wherein said coating chamber opening and said curing chamber opening are disposed in offset relation to each other and said carriage is pivotally mounted for pivotal movement between a lens coating position in which said lens carrier is aligned with said coating chamber opening and a curing position in which said lens carrier is aligned with said curing chamber opening.

11. The coating and curing apparatus of claim 1 wherein said carriage includes reciprocating means for moving said lens carrier between a retracted position and an extended position for extending said lens carrier and the lens into said coating chamber and said curing chamber for, respectively, coating and curing of the lens.

12. The coating and curing apparatus of claim 10 wherein said carriage includes a pivotable mounting bar pivotally mounted within said housing and a pivot drive to pivot said mounting bar.

13. The coating and curing apparatus of claim 12 wherein said carriage includes a reciprocating air drive cylinder for moving said lens carrier between a retracted position and an extended position.

14. The coating and curing apparatus of claim 1 wherein said means for applying a coating includes a coating nozzle positioned within said coating chamber.

15. The coating and curing apparatus of claim 14 wherein said coating nozzle is mounted on a nozzle bar.

16. The coating and curing apparatus of claim 14 wherein said means for applying a coating includes a second coating nozzle.

17. The coating and curing apparatus of claim 14 wherein said means for applying a coating includes an air nozzle for air cleaning of the lens before applying the coating to the lens.

18. The coating and curing apparatus of claim 15 wherein said nozzle bar is slidably mounted for movement between a first coating position and a second coating position.

19. The coating and curing apparatus of claim 1 wherein said means for projecting ultraviolet radiation includes an ultraviolet radiation lamp and a reflector having an axis of reflection.

20. The coating and curing apparatus of claim 1 wherein said second walls define an ultraviolet radiation aperture and said means for projecting ultraviolet radiation is positioned to project ultraviolet radiation through said radiation aperture and into said curing chamber.

21. The coating and curing apparatus of claim 20 wherein said means for selectively blocking the ultraviolet radiation includes a shutter mounted for movement between an aperture closing position and an aperture opening position.

22. The coating and curing apparatus of claim 1 wherein said means for selectively blocking the ultraviolet radiation includes a shield plate mounted in cooperation with said lens carriage and a resilient gasket positioned on said second walls about said curing chamber opening to engage said shield plate when said lens carrier is in said curing chamber.

23. The coating and curing apparatus of claim 1 wherein said means for projecting ultraviolet radiation includes a reflector for reflecting the ultraviolet radiation along an axis of reflection, said lens carrier includes a holder for supporting the lens, said holder having a center, said second walls include a focusing wall intermediate said reflector and said lens carrier during said curing of the coating, said focusing wall defining an aperture, said aperture being positioned along said axis of reflection, said lens carrier being positioned coincident with said axis in said curing chamber during curing of the coating, said aperture permitting projection of the ultraviolet radiation therethrough into said curing chamber and defining a zone of maximum ultraviolet radiation intensity extending from said reflector and said aperture along said axis of reflection, and said holder being positioned so that a predetermined portion of the lens supported thereby is within said zone of maximum intensity and said center of said holder is offset from and outside of said zone of maximum intensity, and further including spinning means for spinning said holder and the lens held thereon about said holder center.

24. An apparatus for curing a coating on a lens, comprising:
a curing chamber;
means for projecting ultraviolet radiation, said ultraviolet radiation means including a reflector for reflecting the ultraviolet radiation along an axis;
a lens carrier for positioning the lens within said curing chamber, said lens carrier including a holder for supporting the lens, said holder having a center;
means for spinning said holder and the lens held thereon about said holder center;
said curing chamber having a wall disposed intermediate said ultraviolet radiation means and said lens carrier, said wall defining an aperture coincident with said axis of reflection, said wall and said aperture being disposed in a plane substantially perpendicular to said axis of reflection;
said aperture permitting projection of the ultraviolet radiation therethrough and defining a zone of maximum ultraviolet radiation intensity extending outward from said reflector and said aperture along said axis of reflection; and
said holder being positioned so that a predetermined portion of the lens supported thereby is within said zone of maximum intensity and said center of said holder is offset from and outside of said zone of maximum intensity.

25. An apparatus for coating a plurality of lenses and curing the coatings on the lenses, comprising:
a housing having first walls defining a coating chamber with an opening in one of said first walls, and said housing having second walls defining a curing chamber with an opening in one of said second walls;
a plurality of lens carriers, each said lens carrier including a hollow spindle having an end and a central longitudinal axis, and a vacuum cup mounted on said spindle end, each said vacuum cup having a central opening communicating with the interior of said hollow spindle;
means for applying negative pressure through each of said hollow spindles and said cup openings for gripping and holding a lens;
means for spinning each of said spindles about its said axis;
said coating chamber opening and said curing chamber opening being disposed in offset relation with respect to each other;
a lens tray for receiving a plurality of lenses thereon, said lens tray being slidably mounted for movement between a lens receiving position outside said housing and a lens gripping position inside said housing at which the lenses received on said tray are gripped by said lens carriers;
a plurality of coating nozzles disposed in said coating chamber for applying coatings to the lenses;
an ultraviolet radiation lamp and a reflector for projecting ultraviolet radiation along an axis of reflection;
said curing chamber defining an aperture aligned with said reflector and said axis of reflection;
a shutter cooperating with said aperture and being selectively moveable between an open position for permitting projection of ultraviolet radiation through said aperture to cure the coatings on the lenses, and a closed position for closing said aperture to block the ultraviolet radiation from passing into said curing chamber; and
a carriage supporting said lens carriers, said carriage being pivotally mounted within said housing for pivotal movement between a coating position in which said lens carriers are aligned with said coating chamber opening and a curing position in which said lens carriers are aligned with said curing chamber opening, and said carriage having reciprocating means for extending said lens carriers and the lenses held thereon into said coating chamber at said coating position at which said lenses are coated, and for extending said lens carriers and the lenses held thereon into said curing chamber at said curing position at which said lenses are cured by the ultraviolet radiation.

26. An apparatus for coating a lens and curing the coating on the lens, comprising:

a lens carrier for gripping and holding the lens;

a housing having first walls defining a coating chamber with an opening in one of said first walls, and said housing having second walls defining a curing chamber with an opening in one of said second walls;

means for applying a coating to the lens within said coating chamber;

means for projecting ultraviolet radiation within said curing chamber for curing the coating on the lens;

means for selectively blocking the ultraviolet radiation from passing into said coating chamber; and a carriage for supporting said lens carrier and the lens held thereby and moving said lens carrier and the lens along a predetermined path of motion within said housing, said path of motion moving said lens carrier and the lens from a first position within said coating chamber at which the lens is supported in an inverted disposition during coating of the lens by said means for coating, to a second position in said curing chamber at which the lens is in a vertically oriented disposition during curing of the coating on the lens by the ultraviolet radiation.

* * * * *